United States Patent
Kita et al.

[11] Patent Number: 5,870,590
[45] Date of Patent: Feb. 9, 1999

[54] METHOD AND APPARATUS FOR GENERATING AN EXTENDED FINITE STATE MACHINE ARCHITECTURE FOR A SOFTWARE SPECIFICATION

[76] Inventors: Ronald Allen Kita, 76 Main St., Hollis, N.H. 03049; Mark Edward Trumpler, 19 Ingleside Rd., Lexington, Mass. 02173; Lois Scirocco Elkind, 51 Arbor La., Hollis, N.H. 03049

[21] Appl. No.: 929,936

[22] Filed: Sep. 15, 1997

Related U.S. Application Data

[63] Continuation of Ser. No. 626,162, Mar. 29, 1996, abandoned, which is a continuation of Ser. No. 403,547, Mar. 14, 1995, abandoned, which is a continuation of Ser. No. 100,005, Jul. 29, 1993, abandoned.

[51] Int. Cl.$^6$ ........................................... G06F 17/16
[52] U.S. Cl. .................. 395/500; 395/183.14; 364/578; 371/27.1
[58] Field of Search ............................... 395/500, 183.14; 364/488, 489, 578, 551.01; 371/27.1

[56] References Cited

U.S. PATENT DOCUMENTS

| | | | |
|---|---|---|---|
| 4,692,921 | 9/1987 | Dahbura et al. | 371/27 |
| 4,933,897 | 6/1990 | Shankar et al. | 395/550 |
| 4,991,176 | 2/1991 | Dahbura et al. | 371/27 |
| 5,038,307 | 8/1991 | Krishnakumar et al. | 364/578 |
| 5,067,129 | 11/1991 | Evans et al. | 370/58.1 |
| 5,161,115 | 11/1992 | Teshima et al. | 364/551.01 |
| 5,317,757 | 5/1994 | Medicke et al. | 395/800 |
| 5,394,347 | 2/1995 | Kita et al. | 364/578 |
| 5,418,793 | 5/1995 | Chang et al. | 371/27 |
| 5,513,122 | 4/1996 | Cheng et al. | 364/489 |
| 5,539,680 | 7/1996 | Palnitkar et al. | 364/578 |
| 5,655,074 | 8/1997 | Rauscher | 395/183.14 |
| 5,659,555 | 8/1997 | Lee et al. | 371/27.1 |

*Primary Examiner*—Kevin J. Teska
*Assistant Examiner*—Tyrone V. Walker
*Attorney, Agent, or Firm*—Christine Kuta; Gary Ross; Diane C. Drozenski

[57] ABSTRACT

A system and apparatus for generating an extended finite state machine (EFSM) from a specification expressed as a set of data relationships. The specification is written in a specification language designed for the purpose, and is parsed in a conventional fashion. The parsed specification is used as input to the method of the invention, which comprises routines for transforming it into an EFSM including states and transitions. The EFSM thus generated is used as input to a traversal procedure, for ultimately generating validation tests to verify the operation of an implementation of the specification, with one such test being generated for each path traversed through the EFSM. The traversal of the EFSM may be carried out in a conventional fashion or by using applicant's EFSM traversal method. The EFSM's transitions represent functions and test information, and the states represent the status of the EFSM at particular points, given the traversal of a particular path through the EFSM, i.e. the history of execution of the EFSM. Annotations are generated and correlated with the transitions, the annotations comprising value assignments, variable value partitions, input or other events, constraints on the execution of the EFSM, predicates acting as prerequisites for the traversal of their associated transitions, and test statements that will act to verify operation of the implementation when the validation tests are executed. Diagnostic function strings are generated as annotations to transitions, for outputting diagnostic statements reflecting the success or failure of the implementation upon execution of the validation tests.

7 Claims, 10 Drawing Sheets

METHOD AND APPARATUS FOR GENERATING AN EXTENDED FINITE STATE MACHINE ARCHITECTURE FOR A SOFTWARE SPECIFICATION

This application is a continuation of application Ser. No. 08/626,162 filed Mar. 29, 1996, now abandoned, which is a continuation of application Ser. No. 08/403,547 filed Mar. 14, 1995, now abandoned, which is a continuation of application Ser. No. 08/100,005 filed Jul. 29, 1993, now abandoned.

BACKGROUND OF THE INVENTION

This invention is directed to an apparatus and method for automatic generation extended finite state machine architectures from software specifications.

In the course of designing a new computer application or operating system, typically one first writes a specification for the application. Such a specification may be tested by automatically generated validation tests, using techniques described below. An important stage in the generation of the validation tests is the transformation of the specification into a finite state machine (FSM), which for a complex specification will typically be an extended finite state machine (EFSM), often in a multi-EFSM architecture (EFSMA) with linking among the EFSMs to form a multiple layer model. It is these EFSMs and EFSMAs that constitute the output of the transformation method of the present invention.

The production of the specification involves specifying the functions the application or system will have to fulfill, defining the types and uses of variables, defining parameters and their relationships, and the other requirements which go into a conventional specification.

Such a specification may be quite extensive. For instance, for the widespread version of UNIX known as POSIX, the specification for the system application program interface (API) for the C programming language runs over 350 pages in the book entitled *ISO/IEC* 9945-1 (*IEEE Std* 1003.1)/*Information Technology—Portable Operating System Interface (POSIX)—Part I* (*First Edition* Dec. 7, 1990), which is incorporated herein by reference.

Software applications developers, system engineers, end users operating in a UNIX environment and others refer to such a specification whenever they author applications based upon it. Typically, such applications are tested during and after their creation, for internal consistency and to ensure that they perform as intended. Such testing will be referred to herein as validation (or validity) testing.

In the case of POSIX, for example, the above-mentioned IEEE reference provides the complete English-language specification of POSIX for the C programming language. Whenever a programmer writes an application in C to run on the POSIX operating system, this reference must be consulted to ensure that all of the standards are being complied with.

It is a very difficult and involved matter to ensure that an implementation of a long specification is consistent with the specification, and yet this is crucial for the proper operation of the implementation and anything based upon it. Testing and verifying the implementation is particularly important when the specification are for a computer language such as C or an operating system such as UNIX. If, for instance, an operating system based upon POSIX includes errors, those errors will create bugs in all programs that run on the erroneous operating system. Thus, before the implementation of POSIX is ever released, it should be fully tested.

Such an implementation will, for the POSIX 1003.1 specification mentioned above, take the form of a program written in the C language. Thus, the validation tests to be run must verify the correctness of this C implementation of the specification.

The concept of specification testing is represented, for example, by STATEMATE, which provides a system by which a programmer can model a specification and test it. See *The STATEMATE Approach to Complex Systems*, by i-Logix of Burlington, Mass. (1990); and D. Harel et al., *STATEMATE: A Working Environment for the Development of Complex Reactive Systems*, IEEE Transactions on Software Engineering, Vol. 16, No. (April 1990). Testing the implementation of a specification (i.e. an application based on the specification), based upon traversal of a graph model based upon the implementation, is discussed in W. H. Jessop et al., *Atlas—An Automated Software Testing System*, Bell Laboratories, Inc., 13th IEEE Computer Society International Conference, pp. 337–340 (1976) and 2nd International Conference on Software Engineering, pp. 629–635 (1976). Various test selection methods for systems expressed as finite state machines are discussed in S. Fujiwara et al., *Test Selection Based on Finite State Models*, IEEE Transactions on Software Engineering, Vol, 17, No. 6 (June 1991) and W. H. Jessop et al. Each of the foregoing articles is incorporated herein by reference.

With the STATEMATE system, the user must convert the English-language (as opposed to computer code) specification into a machine-readable coding. Neither STATEMATE nor other prior systems automatically generate validation tests for the actual implementation of the specification, i.e. for applications which are designed to comply with it.

To generate validation tests of an application, the systems described in the Jessop and Fujiwara articles rely upon an expression of the specification as a finite state machine (FSM). Essentially any specification or software application can theoretically be expressed an FSM, whether the modeled entity is state-rich or expressed as data relationships. An "extended" finite state machine adds context to the transitions (i.e. a record of the history of traversal of the transitions). See the Introduction below for a formal definition of EFSM.

FSMs and EFSM(A)s are particularly suited to state-rich problems. A program is state-rich if it controls a system where the state of the system at any given time is important, such as a program to control an automatic teller machine. A specification for an operating system interface or a program routine, on the other hand, is typically data-rich; that is, the specification is described largely in terms of detailed data structures and their relationships.

Although one can, if necessary, generate an FSM to represent a data-rich specification as states with transitions from one state to another, such a model does not serve well as a human-readable specification.

In addition, hand-generated graph models are subject to the limitations of the programmer who creates them, which can lead to testing inefficiencies or inaccuracies, particularly in the case of a data-rich setting. Data-rich problems are particularly unsuited to being expressed as graph models such as FSMs, since they are by definition descriptions of data relationships, not of states and generating and executing such tests is described below, but is primarily the subject matter of applicant's copending patent application, Ser. No. 08/100,006 entitled "Method and Apparatus for Testing Implementations of Software Specifications" (the "ISL Testing" application), which was filed on the same date as the present application.

The disclosure of the present application overlaps extensively with that of the ISL Testing application, since the description of the transformation procedure of the present invention is best explained in proper context, i.e. the generation of tests as a whole and the execution thereof.

The specification used to generate an EFSM(A) is expressed in a computer language, which can be compiled by a processor to generate tests for the specification, by describing data relationships in the input and output to an application programming interface (API). For this purpose, applicant has created a new language called Interface Specification Language (ISL). The specification is thus expressed as ISL source code. When this source code is compiled, the output includes:

(1) an extended finite state machine (EFSM) or a multiple-EFSM architecture, which is a model of the specification;

(2) user documentation for the specified interface; and (3) validation code, i.e. callable routines allowing compile and run-time validation of parameters to be used before service is provided.

An EFSM or EFSMA generated by compiling the ISL source contains states, transitions and outputs, with context, event and predicate definitions. These concepts are conventional in the definition of an EFSM. See "ESTELLE—A FDT based on an extended state transition model", ISO TC 97/SC21 DP 9074, September 1985, which is incorporated herein by reference. Each transition in the model contains test information describing the result of satisfying a unique data relationship, or providing flow control to allow only valid combinations of data relationships to be selected. Test information is written in the target test language (C, Ada, FORTRAN, etc.) by the ISL compiler.

The EFSMAs are, in the preferred embodiment, constructed in applicant's Path Flow Language (PFL). The construction and use of EFSMAs are discussed in detail in applicant's copending U.S. patent applications, as follows:

"Method and Apparatus for Testing Structures Expressed as Finite State Machines" (the "PFL" application), Ser. No. 08/100,002, issued as "Method and Apparatus for Generating Tests for Structures Expressed as Extended Finite State Machines," U.S. Pat. No. 5,394,347 issued Feb. 28, 1995;

"Method and Apparatus for Testing Implementations of Software Specifications" (the "ISL Testing" application), Ser. No. 08/100,006; and "Method and Apparatus for Schematic Routing" (STE Routing), Ser. No. 08/100,001, U.S. Pat. No. 5,408,597 issued Apr. 18, 1995

Each of the foregoing patent applications was filed with the United States Patent Office on the same date as the present application, and each of the applications and articles cited above is incorporated herein by reference.

The output models (i.e. EFSMs or multiple-EFSM architectures) allow one of several path generation methods to be used, filling the requirements of exhaustive testing, thorough testing and identification testing as defined in *IEEE Std 1003.3—1991/IEEE Standard for Information Technology—Test Methods for Measuring Conformance to POSIX* (1991). See also Chow, T., *Testing Software Design Modeled by Finite-State Machines*, IEEE Transactions on Software Engineering, Vol. 4, No. 3, May 1978. These two references are incorporated herein by reference. In ISL parlance, exhaustive testing may be referred to as "allpaths", and thorough testing or identification testing as "edge cover" or "transition cover".

A given path through an EFSM represents a unique combination of data relationships, and traversing the path produces values for parameters and executable code that correspond to those data relationships, in addition to an API call that, when invoked, traverses the combination of data relationships. The path traversal also produces conditions which will appear in the program shell that is used to test the implementation of the specification.

The process of compiling ISL source into EFSMs is an equivalence transformation-that is, each data relationship or other construct in the original transitions. Thus, although a data-rich specification can be expressed as an FSM, it is very cumbersome to do so, and is not an intuitive way to approach the problem. Moreover, while such a model would be computer-readable, it could not easily be interpreted by humans if complicated data structures are involved. For this reason, FSM-based systems (such as Atlas) are not, in general, useful for data-rich problems. The cited articles do not teach any mechanism for automatically generating validation tests using the specification itself as a starting point.

A system is needed which bypasses the necessity for human intervention in the creation of models to generate testing software against a specification, and which at the same time can produce a set of tests which are accurate and which can be tailored to any degree of comprehensiveness, from testing all possible paths through the model to testing only a few. In particular, a system is needed which allows for modeling of a specification in a manner which is suitable for humans, but which leads directly to an expression of the model which can be used by a computer to generate validation tests for the implementation of the software.

SUMMARY OF THE INVENTION

The present invention comprises a system and method for automatically converting a specification, particularly one expressed as data relationships, into an EFSM or a multiple-EFSM architecture, as required, in the context of automatically generating validation tests for implementations of that specification. The specification may be for an operating system, a software application or routine, or other systems or apparatus definable in specifications, especially those expressed as data structures. The invention thus provides a method and apparatus for automatically generating multiple-model EFSM architectures.

An EFSMA generated by the method of the invention forms an integral part of the overall method for producing tests of an actual implementation of the specification upon which the EFSMA is based. The method of automatically ISL source (and hence in the original specification) is represented by a corresponding structure (one or more objects) in the resultant EFSM or architecture. Thus, the error detection capabilities of the tests realizable by the EFSM definitions apply directly to the ISL specification. In practice, this means that the transition coverage procedure ensures that each data relationship appears in at least one test path, and that all possible output errors from the original model can be detected. (The Chow paper cited above discusses output errors.) For an API call, the impact of every data relationship can accordingly be verified. If the "all-paths" coverage scheme is used, the error detection output includes both output errors and sequence errors. Thus, all combinations of all data relationships can be verified.

Since specifications (such as that for POSIX mentioned above) can be quite complex, typically many EFSMs will be generated, each of which corresponds to some portion of the specification. Thus, an EFSM would be generated for the portion of the specification describing the open (open file)

function, another for the close (close file) function, another for the mkdir (create a directory) function, another for chmod (change mode of the file), and so on for each of the scores of POSIX functions. All of these EFSMs are integrated into a single EFSMA, which produces executable test programs for testing implementation of POSIX. The term "architecture", as noted, refers to a multiple-EFSM state model; however, in the following description, when building or traversing an architecture is referred to, it should be understood that the term may be taking broadly to include a single EFSM (i.e., a single-EFSM architecture).

Since some data structure descriptions represent potentially infinite domains, such as recursively defined data structures, the model created by ISL is annotated to constrain these conditions. This may, at the option of the user, be accomplished by extending the ISL source to allow specification of such execution control (or execution constraint) information, or by directly editing the output model using a suitable model editor. Such an editor has been developed for the present invention by the applicant; it is called the State Transition Editor (STE), and is fully described in the aforementioned "STE Testing" application.

DESCRIPTION OF THE PREFERRED EMBODIMENTS

Figure 1:
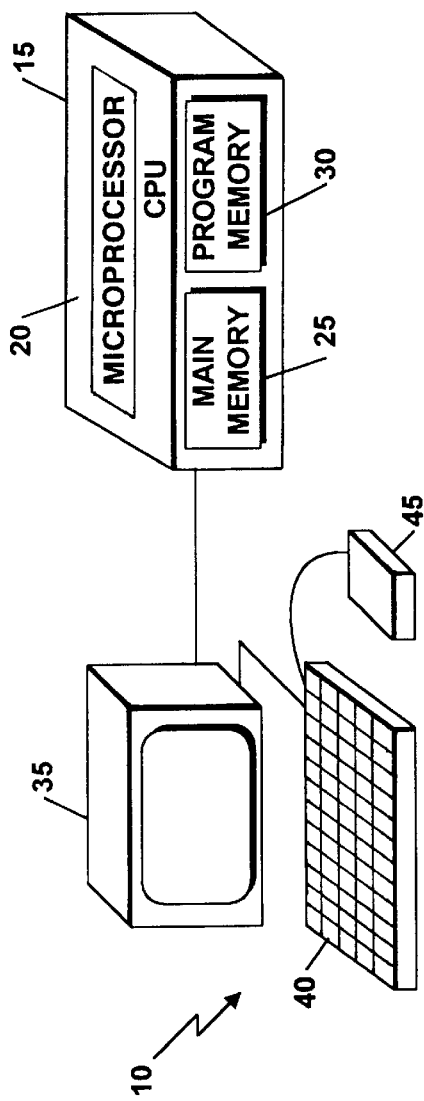
FIG. 1 is a block diagram of a computer system implementing the invention.

The Description of the Preferred Embodiments includes the following sections:
Introduction: Formal Definition of an Extended Finite State Machine
I. The Apparatus of the Invention
II. The Method of the Invention: Generating and Traversing an EFSM
  Method Stage 1: Create specification source code.
  Method Stage 2: Parse the specification source.
    The reference numeral strings appearing in the parsed listings
  Method Stage 3: Transform the parsed source.
    a. Components of an EFSM produced by the transformation procedure
    b. Elements of a transition
    c. Events
    d. Reading the transformation listings (Appendices I and S) for the examples
    e. The functions of modules M1–M16 (Description of each of the modules M1–M16)
  Method Stage 4: Traverse paths through the EFSM.
  Method Stage 5: Post-process the path files.
  Method Stage 6: Create program shells
  Method Stage 7: Couple test programs with program shells to create validation tests
    The routine "sample"
  Method Stage 8: Execute
III. The Interface Specification Language (ISL)
  A. Property Section(s)
  B. Constant Section(s)
  C. Type Section(s)
  D. Routine Section
    1. Syntax
    2. Parameters
      a. I/O status
      b. Optional/Required status
      c. Parameter (or value) constraints
    3. Values
IV. Output
  A. Graphical representation of EFSMs: Path Flow Language
  B. Path files: the validation tests
  C. Documentation
V. Testing an Implementation of an Example Routine: "Sample"
  (Description of the eight method stages for Sample)
VI. Another example: "chmod".
  A. The chmod specification source code
    Background on the POSIX (UNIX) "chmod" routine
  B. The parsing of the source listing for chmod
  C. Transformation of the parsed chmod listing
  D. Traversal of the chmod EFSM and production of validation tests
VII. Method for Generating a Multiple-EFSM Architecture The description of the invention is made in light of the figures and the following attached appendices: (Note the information from Appendices A–T has not been amended into the specification, but is available in the filewraper.)

| Appendix | Contents |
|---|---|
| A | Keywords for ISL |
| B | Backus-Naur Format (BNF) for ISL |
| C | Transformation Method Description for ISL |
| D | ISL User's Guide |
| E | ISL specification source listing for "Sample" routine |
| F | An implementation of the "Sample" specification |
| G | A faulty implementation of the "Sample" specification |
| H | Parsed ISL listing for "Sample" |
| I | Description of transformation of Appendix H |
| J | Path listing for first traversal of "Sample" EFSM |
| K | Path listing for second traversal of "Sample" EFSM |
| L | Path listing for third traversal of "Sample" EFSM |
| M | First portion of program shell for Appendices J, K, L |
| N | Last portion of program shell for Appendices J, K, L |
| O | Procedure for assembling and executing validation tests |
| P | POSIX specification, chmod excerpt |
| Q | ISL source listing for chmod routine |
| R | Parsed ISL listing for chmod routine |
| S | Description of transformation of Appendix R |
| T | Test program for chmod routine |

Appendices A–D specify the syntax and the semantics, including legal and illegal value and structure combinations, for the Interface Specification Language (ISL) that applicant has developed particularly for the system of the present invention. Appendix D is a user's guide to ISL.

Appendices E–O demonstrate the transformation of the specification for a simple function (appearing in Appendix E) into an EFSM (illustrated in FIG. 5), and the generation of validation tests based upon path files derived from that EFSM.

Appendices P–T demonstrate the transformation of the specification for a more complex function, namely "chmod" (change mode) for POSIX, into an architecture for path generation to create tests.

These appendices are discussed in detail below.

Introduction: Formal Definition of an Extended Finite State Machine

A finite state machine (FSM) includes a set of states and a set of transitions connecting those states, where the transitions represent actions, events, predicates, or test information between executed in traversing from one state to the next. An extended finite state machine (EFSM) brings the concept of context to the FSM. An EFSM includes the following elements:

1. A set of states S, each state being of a class, the class being "entry" (= starting), "exit" (= ending), or "other". An "other" state may be an intermediate state or a submodel, both of which are discussed below.
2. A set of events (inputs, stimuli) E, specified by $e_{ij}$, where i represents a from-state and j represents a to-state for a transition $t_{ij}$ (see below) from state i to state j, and $e_{ij}$ is an event along the transition $t_{ij}$.
3. A set of outputs O.
4. A set of variables V.
5. A set of contexts C, such that $$c_i : v \to \{n_1, n_2, n_3, \ldots, n_x\},$$

i.e. such that the context $c_i$ for a given path up to state i maps a set of variables v (i.e. a variable stack or ordered set of variables) onto an ordered set of variable values $n_1$, $n_2$, $n_3$, etc. Thus, at each state, for a given path traversed through the EFSM up to that state, a context $c_i$ is defined that maps all variables onto their respective values due to the particular path traversed. The context reflects the history of the machine execution up to a given point in that execution, including the set of states through which the machine has traveled, the set of transitions the machine has taken, and the set of events that have occurred during the execution.

6. A set of predicates P, such that $$p_{ij} : c_i \to <\text{TRUE, FALSE}>,$$

where $c_i$ is a member of the set C, i.e. is a context as defined in 5 above.

7. A set of transitions (mappings) T, such that if and only if $$p_{ij} : c_i \to \text{TRUE},$$

then each transition $t_{ij}$ consists of:
(a) next output: $\{s_i, c_i, e_{ij}\} \to o_{ij}$
(b) next state: $\{s_i, c_i, e_{ij}\} \to s_j$
(c) next context: $\{s_i, c_i, e_{ij}\} \to c_j$ These are three mappings of the transition $t_{ij}$, which are performed only if the predicate $p_{ij}$ is true for the given context $c_i$ at the from-state $s_i$. The transitions describe under what circumstances the machine changes state, and specifies the state to which is changes. Mapping (a) indicates that the from-state $s_i$, the context $c_i$ (which has been generated over the path taken up to this from-state), and an event $e_{ij}$ along the transition to the next state (which will be $s_j$), map onto an output $o_{ij}$. The same three elements also map onto the next state $s_j$, as well as onto the new context $c_j$ at the new state, which is derived from the previous context $c_i$, updated according to any functions performed in taking the transition $t_{ij}$ to the state $s_j$.

Not all aspects of the use of context are presented in the present application, but the concept is fully discussed in applicant's aforementioned PFL patent application. The present invention is in any case applicable to EFSMs as defined above.

I. The Apparatus of the Invention

The invention is preferably implemented in a computer system such as system 10 depicted in FIG. 1. The system 10 includes a central processing unit (CPU) 15 including a microprocessor 20 coupled to main memory 25 and program memory (such as ROM or RAM) 30. Computer input and output may be displayed on a monitor 35 or other output device, such as a printer (not shown). User input is provided via a keyboard 40, a mouse or trackball 45, and other standard input devices.

The system 10 is conventional, and may be a microprocessor system, a workstation or networked terminal system, or any of a variety of other apparatus providing computing and input/output capabilities.

All of the method steps described below, except for the original creation of the specification whose implementations are to be tested, are carried out in the microprocessor 20. The implementations themselves are, of course, applications designed by programmers. Thus, the apparatus of FIG. 1 carries out all the steps of the invention automatically. Given the following detailed description of the method of the invention, it will be a routine matter for a programmer to produce code to carry out all of the described steps.

II. The Method of the Invention: Generating and Traversing an EFSM

Figure 3:
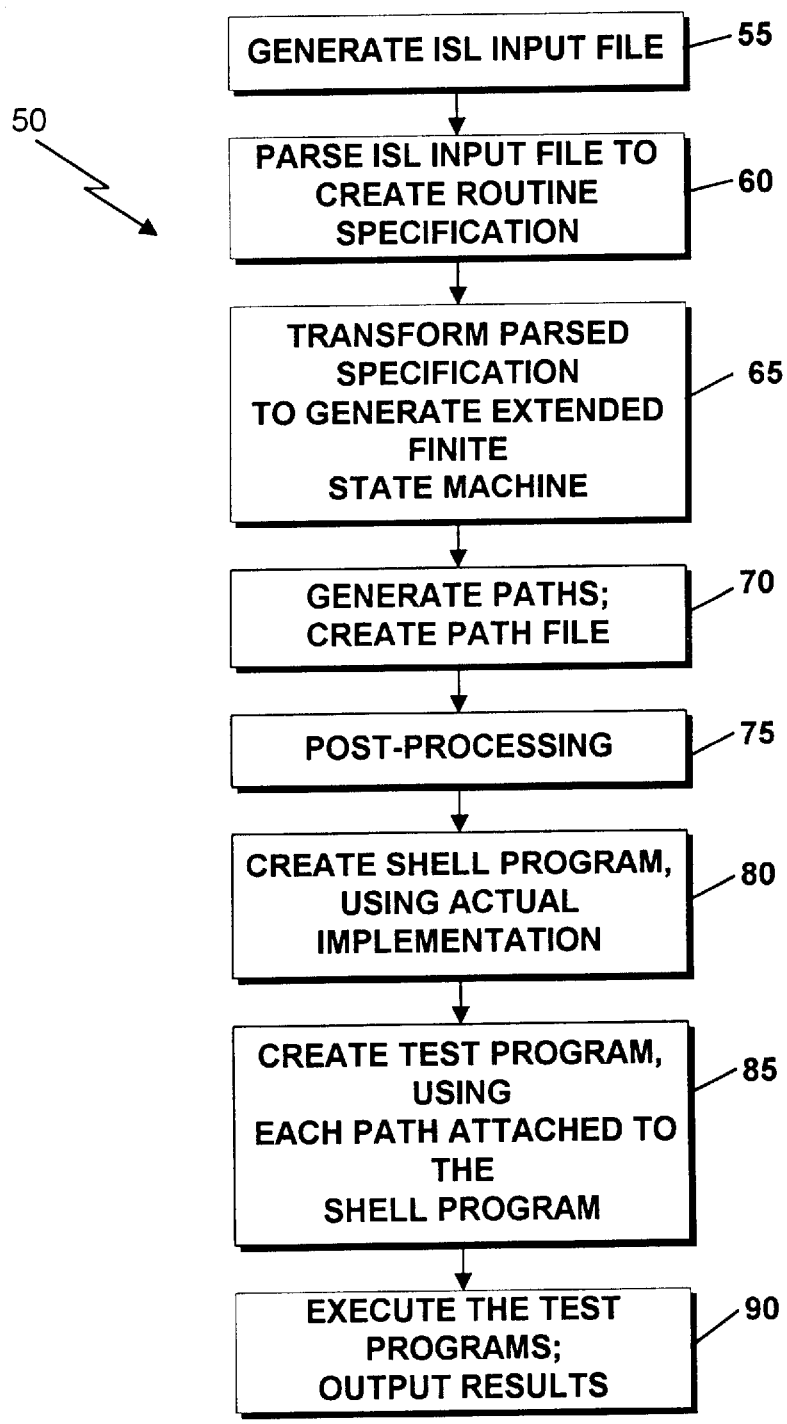
FIG. 3 is a flow chart of the overall method of the invention.

As illustrated in the flow chart 50 of FIG. 3, there are eight basic stages involved in testing a given implementation of a specification. These are discussed in general terms below, followed by detailed descriptions of the application of the method to two examples (in Sections III and IV below).

Stage 1 (box 55). Create the specification source code, using the BNF and the Transformation Method Description for syntax and semantics. This specification source code is an ISL file compilable by a parser (see stage 2). It may be derived from a plain-English specification or may be coded as an initial matter in ISL.

Stage 2 (box 60). Parse the specification source code, using a parser created by a conventional automatic compiler as applied to ISL.

Stage 3 (box 65). Transform the parsed specification, using a program meeting the description of the Transformation Method (Appendix C), thus generating an EFSM representing the original specification.

Stage 4 (box 70). Traverse paths through the EFSM (or architecture) thus generating individual validation tests of the original specification. The EFSM may be comprehensively traversed in an "exhaustive testing" (allpaths) mode, or selected paths may be traversed in either a "thorough testing" or an "identification testing" (edge cover) mode, by using execution constraints. Validation tests are flagged. The output is a path file which is in the language upon which the specification was based (such as C).

Stage 5 (box 75). Post-process the path files to place validation tests at the ends of the respective files.

Stage 6 (box 80). Create a program shell for the implementation of the specification.

Stage 7 (box 85). Add the program shell to each path file, thus generating a test program for each path file.

Stage 8 (box 90). Execute these test programs, and generate error outputs for those conditions under which the implementation is inconsistent with the specification.

Method Stage 1: Create Specification Source Code.

The specification source code created in stage 1 is important to the automatic generation of an EFSM representing the specification, and hence of tests for the implementation thereof. Thus, the ISL (discussed in Section III below) is an important element of the invention; however, alternative languages may be developed and used for this purpose, as long as they can express a specification and can be parsed as in stage 2 to produce data structures and relationships which can then be transformed into an EFSM according to stage 3.

The specific requirements for an ISL source listing for a specification are given in Section III below.

Given Appendix B (the BNF for ISL), an ordinary-English specification or a list of specification requirements, and a knowledge of a language such as C, a programmer will be able to generate the source code for the specification needed to practice the present invention. Examples of ISL specifications appear in Appendices E (for a routine called "Sample") and Q (for the chmod operation under POSIX, shown in Appendix P).

Method Stage 2: Parse the Specification Source.

The ISL source listing of is parsed in a conventional manner by a parser generated by a standard compiler, such as YACC. See Stephen Johnson, "YACC: Yet Another Compiler Compiler", Bell Labs (Murray Hill, N.J.), which is incorporated herein by reference. (YACC is also discussed in virtually any UNIX documentation.) The compiler doing the parsing uses the BNF listing for the language in which the specification was written (here, applicant's ISL), along with annotations and other definitions that the compiler needs, including definitions of objects which are to be referenced, definitions of symbols which are used, input/output functions, and so on. Automatic parsing procedures are well known.

The results of parsing the source listings of Appendix E and Q appear in Appendix H (for "Sample") and R (for chmod), which also include applicant's added numerical references relating the parsed results to the general transformation method set forth in Appendix C and to the comments contained in the respective ISL source listings.

The parsing procedure generates a symbol table reflecting the information expressed in the original specification. The symbol table organizes the information by its role in the API, such as: properties and constants (including header file or comment information); routine name declarations; syntax declarations; parameters; and parameter constraint information. Parameter constraints are discussed below. (Execution constraints, mentioned above, are different: they are restrictions on the traversal of the EFSM, not on values of parameters. See discussion of Method Stage 4, below.)

The parsing of the specification breaks down all expressions and declarations into their components, and stores them in a family of structures that captures both the raw data and the context in which it is used. This allows reconstruction into the original expressions for display purposes. When parsing is complete, the symbol table is filled in only in skeletal form.

Appendix C, the Transform Method for ISL, defines (beginning on page 1) the data structures which are used (sections A through I). Each data structure includes an enumerated list of characteristics, such as items 1–4 under "Routine", defining the name, type, list of field groups, and optional statement. It is these lists which lead to the numerical string references accompanying the parsed listings of Appendices H and R.

The Reference Numeral Strings Appearing in the Parsed Listings

It should be noted that these numerical references are used only to facilitate the analysis of the method of the invention, and do not form a part of the method per se. Once it is understood how these numerical references are generated, they are useful in tracing the creation of the parsed source listings and the transformation of the parsed listings into EFSMs or architectures.

It will be seen that some of the defined structures A–I in Appendix C refer to other data structures. Thus, a ROUTINE has a name and a type; and in order to determine how the type may be defined, one must refer to B (the TYPE listing). The type may then include a partition (item 8), for which we must refer to I: PARTITION (on page 3 of Appendix C). A partition may itself have a type denoted by a type partition (item 6), or a property denoted by a property partition (item 7), or may in fact include a list of partitions (item 8). For item 6, we refer back to the TYPE structure; for item 7, to G: PROPERTY; and for item 8, we refer recursively to I: PARTITION. A given data structure having this mixture of characteristics would be defined by a concatenated numerical string identifying the path followed through the defined data structures A–I.

Each entry in the parsed specifications appearing in Appendices H and R is identifiable by such a concatenation of numerals. For instance, the first two lines in Appendix H state:

The routine specification describes a routine that 1) is named "sample"

Since the specification defines a routine, we refer to A: ROUTINE in Appendix C. "Name" appears under item 1, so "is named 'sample'" is accompanied by a reference to "1".

The next lines are:

2) has a return type that 2.1) is not named 2.2) is classified as an integer type 2.3) occupies four (4) units of storage 2.4) is signed These lines indicate that "sample" returns an integer, as in fact it does (see under SYNTAX in Appendix E). The reference to the type of the routine correlates to item 2 under "Routine" in Appendix C, namely "the type (q.v.) describing the datatype of the routine's output".

Referring now to TYPE (data structure B in Appendix C), item 1 refers to "name"; so the line above stating that the type is "not named" has the reference 2.1. Similarly, the type classification as an integer has reference 2.2 (since type classification is item 2 under "Type"), the size (4 bytes) has reference 2.3, and the sign characteristic has reference 2.4.

Similarly, "sample" includes a field group ("a") which is defined in the parsed listing. The corresponding numerical references begin with a "3" because the field groups are under item 3 in the ROUTINE section of Appendix C.

"Sample" contains only one field group in its "list" of field groups, identified at line 3.1 (the "1" referring to the first field group). The single field group also contains only one field, leading to the designation 3.1.1. (In general, when a list is encountered, the number of the item in the list will be identified by an additional numeral. The second field in the group, if there were one, would have the reference numeral 3.1.2.)

Using this approach, any entry in Appendix H or Appendix R can be analyzed. For instance, refer to the numerical entry 3.1.1.2.8.8.5.7 in Appendix R. It defines a data structure as follows:

| Digit | Corresponding entry in Appendix C |
|---|---|
| 3 | Routine: list of field groups |
| 1 | first group in the list of field groups (go to C: FIELD GROUP) |
| 1 | first (and only) field in this group (item C(1); go to D: FIELD) |
| 2 | type (item D(2); go to B: TYPE) |
| 8 | has a partition (item B(8); go to I: PARTITION) |
| 8 | the partition is composed of a list of partitions (item I(8); recursively go to I: PARTITION again) |
| 5 | the fifth partitition in the list of partitions |
| 7 | has a property (item I(7)), namely the name "file_does_not_exist". |

(The meaning of this structure will be made clear in Section V below.)

These numerical cross-references in the listings of Appendices E/H and Q/R, manually created by applicant, show in the above manner how they relate to one another and to Appendix C. As noted above, the parsed result represented by Appendix H is itself generated automatically by the parser created by YACC; that is, the processor stores an internal representation of the relationships and hierarchies expressed in Appendix H. In normal use, one would not print out this parsed code, nor insert the numerical reference strings; this is done here for explanatory purposes. By inspecting each numerical reference string in Appendices E/H and Q/R in light of the transformation method data structures in Appendix C, it can be shown that Appendices H and R represent valid parsings of the coded specifications of Appendices E and Q, respectively.

Method Stage 3: Transform the Parsed Source.

The output of the transformation in stage 3 is an EFSM representing the entire input specification. (The EFSM may, however, include submodels which themselves include submodels, and so on.) The EFSM is an internal representation of a connected graph corresponding to the specification, and can be visually represented, as in FIGS. 5 and 6A–6B. It is expressed in applicant's Path Flow Language (PFL) (see above-mentioned "PFL" patent application) or another language suitable for representing EFSMs. See the general discussion of EFSM graphical representations in Section III.E below.

The EFSM is generated by traversing the data structures created during the parsing procedure, creating states and transitions as needed for each data structure. Some data is transformed into testing information that annotates the transitions of the connected graph, while some is transformed into control information (or parameter constraints) on the graph.

Appendix C, beginning at page 7, includes a description of the method of transforming the parsed listing (Appendix H or Appendix R) into an EFSM. Appendix C is a plain-English representation of the transformation method of the invention. The method is largely self-explanatory from this appendix, but will be discussed in detail for the examples.

The overall method includes sixteen subsidiary method modules M1 through M16, which are listed at page 8 of Appendix C and are described in detail on the succeeding pages. (To maintain the distinction between the overall transformation method and its subsidiary methods M1–M16, the latter will generally be referred to simply as "modules".) In implementation, the transformation method is coded to provide automatic transformation of the parsed listing of the specification in question. Given Appendix C, coding the method is a routine matter for a programmer.

Figure 4:
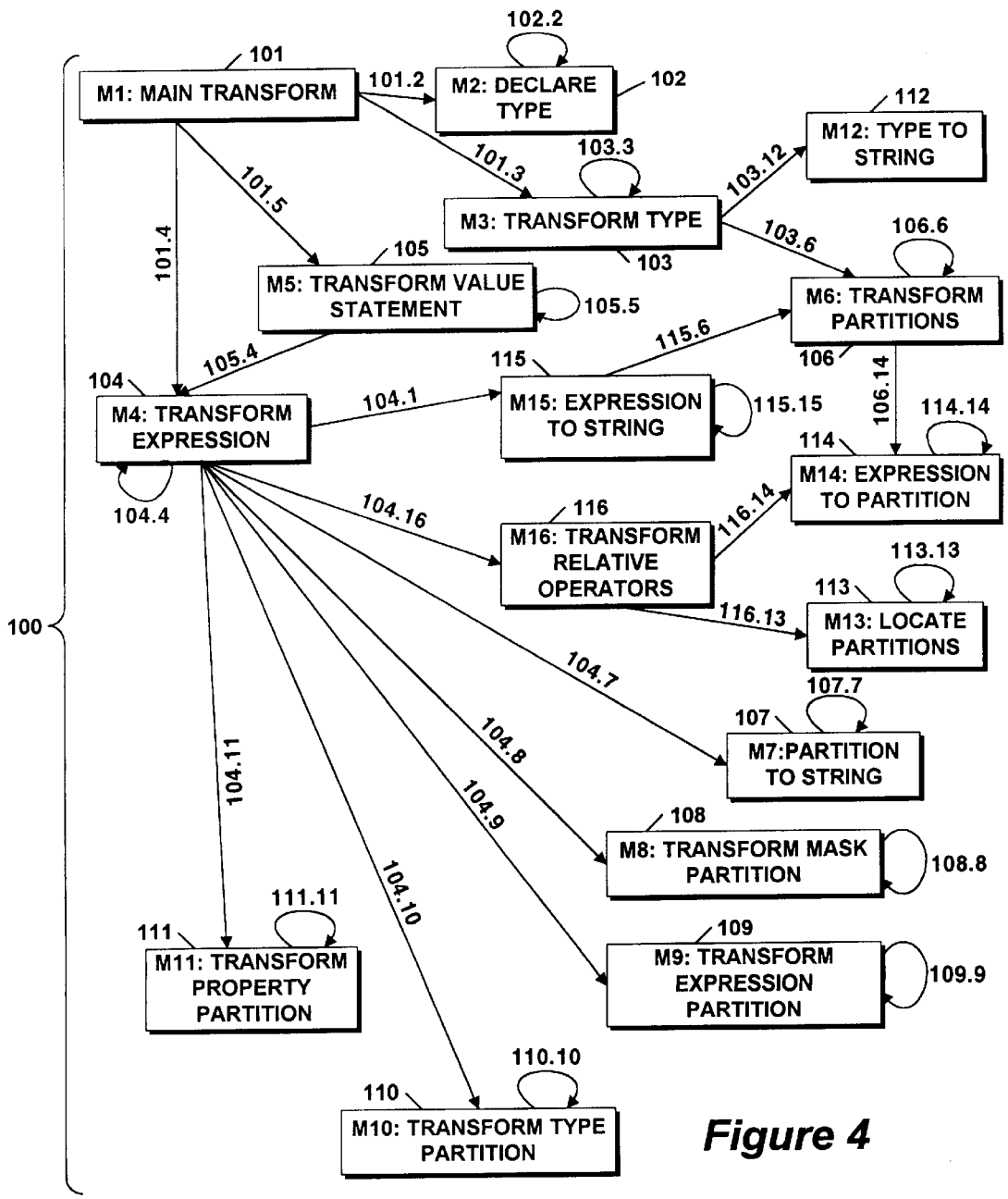
FIG. 4 is a functional block diagram of the transformation procedure of the invention, showing the relationships among subsidiary method modules of the transformation procedure.

FIG. 4 is a functional block diagram of the transformation method, showing the interrelationships among subsidiary modules M1–M16 (represented by boxes 101–116 and described fully in Appendix C). Each arrow from one module box to another represents a call from one module to the other. For instance, arrows 101.2, 101.3, 101.4 and 101.5 indicate that the main transformation module M1 may directly call any of the modules M2, M3, M4 or M5. An arrow looping around from a box to itself represents a module recursively calling itself, such as arrow 102.2 coming from, and ending at, module M2 (box 102). (Note that the reference numeral for a given arrow is the same as that of the module from which it emanates, plus a decimal indicating the module to which it is directed.)

Following is a description of the function of each of the sixteen transformation method modules M1–M16. Which of this modules is used in the transformation of a given parsed specification, and the order in which the modules are called, depends on which elements are present in that specification. However, every transformation procedure must begin with the main transformation module M1, and must follow steps M1:1 through M1:14 of that module.

a. Components of an EFSM Produced by the Transformation Procedure

As noted above, EFSMs are known and used in the art of validation testing. It is useful to note the elements of an EFSM:

(1) a set of states, including one labeled as the starting state and one labeled as the ending state. There will generally be many intermediate states for any nontrivial EFSM.

(2) a set of transitions (see below) that describe under what circumstances the EFSM changes state, and to what state it changes.

(3) a context describing the path history of the current EFSM execution at any intermediate point in the execution, including the following:

(3a) the set of states through which the machine (EFSM) has traveled;

(3b) the set of transitions the machine has taken; and (3c) the set of events (see below) that have occurred during the execution.

b. Elements of a Transition

A transition is a mapping from one EFSM to another, and includes the following:

(1) input conditions for the transition, including:

(1a) a state in which the machine must be for this transition to be taken;

(1b) an input event (optional);

(1c) a parameter constraint (optional) which the current machine context must satisfy for this transition to be taken; and (1d) a predicate (optional), comprising textual references to components of the machine context, combined into a single text string using logical operators (AND, OR, NOT).

(2) output conditions for the transition, including:

(2a) the state into which the machine changes if the transition is traversed;

(2b) a new context (optional) or change in the context, which becomes the new context if the transition is traversed;

(2c) an event (optional), which is added to the new context if this transition is traversed; and (2d) a string of test data.

c. Events

An event is a named object that may be attached to a transition, and that may have data associated with it which can be retrieved by name during the execution of the EFSM.

d. Reading the Transformation Listings (Appendices I and S) for the Examples

The transformation procedure 100 of FIG. 4, including the sixteen modules discussed below, converts the parsed ISL code into an EFSM stored in the memory 30 of the CPU 20. The EFSM 130 is merely a graphical representation of the internally stored model of the specification.

The transformation method always begins with module M1 (see the listing in Appendix C). Step 1 of method module M1 (which may be referred to as step M1:1) indicates that a starting state must be created. Appendix I, which represents the application of the transformation method (Appendix C) to the parsed "sample" listing (Appendix H), indicates execution of step M1:1 under "State S0", which states that "an entry state is created, S0". This state S0 is graphically represented as vertex 200 in FIG. 5.

In general, reference herein to a method (or module) step such as M1:1, M6.2.2.1 or the like refers to either the general statement of the transformation method found in Appendix C or the specific application of that method to one of the examples as set forth in Appendix I (for "sample") or S (for chmod), depending on context.

From FIG. 4 (and from the listings of the modules in Appendix C), it can be seen that all of the modules except for modules M1, M5, M12 and M16 may call themselves recursively. This is indicated in Appendices I and R by parentheses. Thus, in Appendix I under "State S3", the first call of module M6 starts with M6:1—i.e., step 1 of module M6. When it calls itself a few lines later, however, the entry is M6(2):1—step 1 of module 6, second "nested" call (first recursive call).

In this way, Appendices I and S can be interpreted. They will be discussed in detail in Sections III and IV, respectively.

e. The Functions of Modules M1–M16

The transformation procedure of Appendix C involves two basic procedures: (1) the creation and annotation of EFSM components (see above); and (2) the building of a sequence of these EFSM components, along with annotations, based upon the content of the program routine specification.

The transformation modules perform the following general functions in generating an EFSM from the data structures represented by the parsed specification:

(1) States are created, including a starting and ending state.

(2) Transitions are created between states, going in each case from the present input state (1(a) under Elements of a Transition above) to the present output state (1(b) under Elements of a Transition).

(3) One or more events may optionally be attached to any transition, defined by the name of the event and the data associated with the event.

(4) Tests data, characterized by a data string, may optionally be attached to any transition.

(5) One or more predicates, characterized by a string containing the predicate expression, may optionally be attached to any transition.

Module M1: Main Transformation

This is the main module, through which every transformation must proceed. It specifies the fundamental steps required to convert a parsed specification into an EFSM. The steps are summarized below, and are set forth in more complete detail in Appendix C.

Step M1:1. The starting state is created. An example is state S0 (vertex 200) in FIG. 5.

Step M1:2. A declaration (in the form of a data string) for the return value of the routine is generated, using module M2.

Step M1:3. Another state is created.

Step M1:4. A transition is created between the starting state and the second state.

Step M1:5. A program header string is added as test data annotation to the transition.

Step M1:6. The declaration string from step M1:2 is added to the transition.

Step M1:7. The second state (created in step M1:3) is remembered as the current state.

Step M1:8. This step declares the type of each field in each of the field groups specified in the declaration of the routine. For each such field, a new state is created, and a transition is created from the current state to the new state. A data string representing the type declaration is added to the transition. The new state is then remembered as the current state.

This step calls module M2 in order to declare the field type. The step is reiterated until each field in each field group is represented by a type declaration annotated to a transition to a new state.

Step M1:9. This step also processes each field of each field group in the routine declaration. Substeps M1:9.2* (i.e. the block of steps M1:9.2 through M1:9.2.6.2.6) form the core of this step, including constructing (by a call to module M3 at step M1:9.2.4) a section of the EFSM for each field and assigning values to the field as identified by a field partition.

In substeps M1:9.2.6.1*, including a call at step M1:9.2.6.1.1 to module M4, a predicate expression is created for each value constraint, and it is annotated to a new transition going to a new state.

In substeps M1:9.2.6.2*, module M4 is again called for any fields that are identified as required if or required iff, and a predicate string is created reflecting the requirement. A transition is created to the current state and a predicate annotated to it reflecting the negation of the predicate string.

Substeps M1:9.3.1* create a new state and transition for any field indicated to be optional. Substep M1:9.3.2 adds a string indicating assignment of no value to the transition for each field that is not indicated to be required.

Step M1:10. If the routine declaration contains a value statement (which is optional, but in practice will usually be present), this step calls module M5 to build a portion of the EFSM corresponding to the value statement.

Steps M1:11–12. Here an exit state is created, and a transition to the exit state.

Step M1:13. A data string is added to the final transition, indicating an invocation of the specified routine. The parameter values are the names of the fields, and the output value is "result".

Step M1:14. Another data string is added to the final transition, representing a program closing.

Module M2: Declare Type

This module, called in step M1:8.1.1 of module M1, receives as input a string and a type, usually the name and type of a field, and constructs and returns a text string corresponding to the input. Different data types are treated differently: pointer (substeps 2.1*); array (2.2*); void (2.3*); integer (2.4*); opaque or indirect (2.5*); and floating point (2.6*). Recursive calls to M2 are made until all depths of the input type have been processed.

Module M3: Transform Type

This module is called by step M1:9.2.4, and constructs a section of the EFSM including value assignments to the field identified by the input string. (The value assignments are test data on the transitions.) The module has as input a string identifying the name of the field, a partition identifying the values of the type, a starting state, and an ending state. In addition to this information, the global state and transition locations are referenced, well as the global partition level indicating the invocation level in calls of module M6 (Transform Partition).

Different field types are treated differently: pointer (substeps 1.1*); opaque, integer, floating or void (1.2*); struct or union (1.3*); and indirect (1.4*).

Module M4: Transform Expression

Module M4, as shown in FIG. 4, is a module central to the transform procedure, including calls to most of the other modules. Module M4 is itself called by module M1, steps M1:9.1.6.1.1. and M1:9.2.6.2.1, for, respectively, fields that have value constraints and field that are indicated as being "required if" or "required iff". It receives as input an expression identifying an expression, and converts this into a predicate string representing references to all transitions corresponding to value references made in the expression. If there are Boolean operators in the expression, these will be reflected in the predicate string. The predicate string is returned to the calling routine. States and transitions may be created, and the predicate string(s) annotated onto the appropriate transition(s).

Different operator types (see Section III.D below) are treated differently, namely mask, choice, or array (substeps M4:1.1*) or range (substeps M4:1.2*). In the latter case, module M7 (Particle to String) is called.

The expression is classified (see Appendix C, Section F: Expression) depending upon the number of subsidiary expressions, as follows:

Expression Class 0: a basic object

Expression Class 1: having a single subsidiary expression

Expression Class 2: having two subsidiary expressions

Expression Class n: having more than two subsidiary expressions (or a nonfixed number of subsidiary expressions)

Appendix C, Section F gives further detail as to expression operators, types, etc. The classification of the expression operators corresponds to the classification of the expression itself. Operators of the four classifications are described in detail in Appendix C, under "Expression Operators".

Steps M4:2* treat expressions of classification 2, with the treatment depending upon the operator of the expression:

for OR: substeps 2.1* are invoked, including recursive calls to module M4;

for AND: substeps 2.2*, also including recursive calls to M4;

for "has property": substeps 2.3*, including calls to module M11 (Transform Property Partition);

for "mask contains": substeps 2.4*, including a call to module M8 (Transform Mask Partition) if the expression is NULL;

for "type": substeps 2.5*, including a call to module M10 (Transform Type Partition);

for "pointsto" or "dot": substeps 2.6*, including recursive calls to M4;

for "property": substeps 2.7*; and for all other types of operators: substeps 2.8*, including a call to M16 (Relational Operators).

Steps M4:3* treat expressions of classification 1, with the treatment again depending upon the operator of the expression:

for "has property": substeps 3.1*;

for "property": substeps 3.2*;

for "present": substeps 3.3*, including a recursive call to module M4;

for "verify": substeps 3.5;

for "pointer": substeps 3.6*, also including a recursive call to module M4; and for "negate": substeps 3.7*, including a call to module M3 (Transform Expression).

Steps M4:3* treat expressions of classification 0, generating a string corresponding to the name of the operator (for "number" or "string"), or the name of the described type, field or property, as the case may be.

Module M5: Transform Value Statement

This module receives a statement as input, which may be of the type "block", "simple", "conditional", or be empty. It constructs a section of the EFSM corresponding to the input statement. A block statement, treated in substeps M4.2*, results in a section of the EFSM with a sequence of independent substatements. An empty statement (substep M5.4.3) results in no new addition to the EFSM. A simple statement (substeps M5:4.4*) leads to a call of module M4 (Transform Expression). This call is represented in FIG. 4 by arrow 105.4, leading from module M5 (box 105) to module M4 (box 104).

A conditional branch statement (substeps M5:4.5*) results in the creation of new states and transitions representing the alternatives (see steps M5:4.5.2–M5.4.5.6), and M4 (Transform Expression) is called (step M5:4.5.7). The transitions are annotated with strings representing the alternatives of the conditional statement.

Module M6: Transform Partitions

This module has as inputs a string identifying a location where values are to be stored, a partition identifying those values, a starting state and an ending state. The partition relates to possible values for a variable, such as an assignment, where alternative values must ultimately be tested. For instance, an assignment of a=2 will lead to a partition where values of a<2, a=2 and a>2 are all tested in the validation tests of the implementation. A partition may be divided, in which case it includes a set of subsidiary partitions covering the set of values indicated.

This module results in a section of the EFSM with a single new transition representing an assignment statement (for a non-divided partition), or with new transitions corresponding to alternative value assignments as determined by the partitions. Different types of partitions are treated in different portions of the module:

Divided partitions are treated in substeps M6:2*, including a recursive call to module M6 for each subsidiary partition of the divided partition.

Mask partitions are treated in substeps M6:3*, including calls to modules M14 (Expression to Partition) and M15 (Expression to String).

Type partitions are treated in substeps M6:4*, including a call to module M3 (Transform Type).

Discrete partitions are treated in substeps M6:5*.

Range partitions are treated in substeps M6:6*.

Expression partitions are treated in substeps M6:7*, including a call to module M15 (Expression to String).

Property partitions are treated in substeps M6:8*.

Module M7: Partition to String

This module receives two partitions as input, the second of which is a range partition, and the first of which may be a range partition, a discrete partition or a divided partition. If the first partition is a range partition and its value falls within the second partition's range, a string referring to the first partition's transition is returned; otherwise, a null string is returned (see steps M7:1*). If the first partition is a range partitions (see steps M7:2*), a similar procedure is executed.

If the first partition is a divided partition (see steps M7:3*), module M7 is recursively called for each of the subsidiary partitions of the divided partition. If the first partition is any other kind of partition, a null string is returned.

Modules M8, M9, M10 and M11

These modules (Transform Mask Partition, Transform Expression Partition, Transform Type Partition and Transform Property Partition) perform essentially identical operations. Each receives as input a partition and an object which may be an expression (for a mask partition (M8) or an expression partition (M9)), a type (for a type partition (M10)), or a property (for a property partition (M11)). Each module returns a predicate expression corresponding to a transition at which the value corresponding to the expression is assigned. Step 2 calls module M8 and step 3 calls module M9.

Module M12: Type to String

The input to this module is a type. The output is a string containing a C expression identifying the type. For instance, for an integer occupying four bytes of storage, this module would return a string ("LONG INT") reflecting this.

Module M13: Locate Partition

This module receives as input two partitions, the second of which is a discrete partition whose range falls within that of the first partition. A string is returned containing reference to a transition corresponding to the subsidiary partition of the first partition that matches the value of the second partition—unless the value match is found in a mask partition.

If the first partition is divided, substeps M13:1.1* perform a recursive call to module M13 for each subsidiary partition of the first partitition. Substeps M13:2* show the treatment of a discrete partition. If the first partition is a mask partition (substeps M13:3*), module M13 is recursively called in a more complicated treatment (including also substeps M13:3*). For other types of partitions, an empty string is returned (steps M13:4*).

Module M14: Expression to Partition

This module is called by module M6 (Transform Partitions), which is itself called during parameter or value statement transformations by modules M3 (Transform Type), M15 (Expression to String) or M16 (Transform Relational Operators), M15 and M16 themselves being called by M4 (Transform Expression). See FIG. 4.

Module M14 receives as input an expression and a partition. The expression is a subsidiary expression of an expression. If the partition is null (substeps M14:2*), a null is returned. The treatment of the expression depends on whether it is or classification 1 (steps M14:3*), 2 (steps M14:4*), 0 (M14:5*) or n (M14:6*).

This module is part of the process of producing text strings for use as predicates or test information.

Module M15: Expression to String

Module M15 is called by module M4, as shown in FIG. 4, and receives an expression as input, such as an expression representing a data location. The output is a string containing a C expression corresponding to the input expression. The output string produced depends upon the kind of operator of the input expression. For certain kinds of operators (dot, pointsto and length), M15 is called recursively; see steps M15:2*, M15:3* and M15:4*, respectively. If the expression operator is "constant", "number" or "string", the text string contains the constant's name (M15:5*), the formatted number (M15:6*), or the expression's string, respectively (M15:7*).

Module M16: Transform Relational Operators

This module is called by M4 (Transform Expression), as shown in FIG. 4. The input to the module is an expression, which is a subsidiary expression to the expression in the calling modules, and which is a binary expression including a relational operator. It returns a predicate string corresponding to both halves of the binary expression and of the operator.

If the input expression has a partition associated with it, then a predicate expression corresponding to the edge in that partition is returned. This situation is treated in steps M16:1.2*.

If the input expression does not have a partition, this means that a more complicated predicate must be constructed. This situation is covered in steps M16:1.1*. This arises under certain circumstances, such as when (1) the operator of the predicate expression is ==(EQUAL) or !=(NOT EQUAL), and (2) operator of the second subsidiary expression is choice, then the predicate expression that is formed is the result of processing the second subsidiary expression, and all the subsidiary expressions of that choice expression will have partitions associated with them, and those partitions will have associated edges, all of which must be ORed together. If the operator of the input expression is NOT EQUAL, then these Ored-together edges are negated in the output predicate expression (see M16:1.2.1.2*.)

Treatment of "eq" and "neq" (for "equals" or "does not equal") operators are in steps M16:1*, and of other non-null operators in M16:2*. The second subsidiary expression of the input expression is processed (step M16:3) by a call to module M14 (Expression to Partition). The partition of the second subsidiary expression is processed by a call (step M16:4) to module M13 (Locate Partition). If the operator is "neq", it is further treated (steps M16:1.5*) by the creation of a text string which is the NOT of the result of the call to module M13.

Operators of the types "ge" or "gt" (for "is greater than or equal to" or "is greater than") (steps M16:2*) and "le" or "lt" (for "is less than or equal to" or "is less than") (M16:3*) result in a partition of the type of the first subsidiary expression of the binary expression, and a text string associated with the partition's transition.

The result of the transformation is, as noted, an EFSM representing the specification. Graphical representations of EFSMs are shown in FIGS. 2, 5 and 6A–6B. See Section III.E below for further discussion of these representations.

Method Stage 4: Traverse paths through the EFSM.

In stage 4, the EFSM is traversed, which may be accomplished by a conventional path generation method. For instance, the method described in the Jessop article on Atlas may be used. Each test will consist of a single path through the EFSM, each such path effectively constituting a set of test data (such a set being known as a test vector) which is input to the implementation. If there are, for instance, fourteen paths generated through the EFSM, then there are fourteen text vectors on which the actual program must be run to determine whether, in each case, it complies with the specification.

Applicant's aforementioned copending PFL application includes a thorough description of a method of traversing the EFSM.

As noted, stage 4 may be carried out exhaustively or selectively. For small EFSMs, i.e. those with relatively few paths (from several to several thousand), the exhaustive approach is preferable, since the program is comprehensively tested for all possible combinations of variable values, etc.

However, a complicated specification may have very large numbers of possible combinations of variable values or other parameters, and hence very large numbers of possible paths through the resultant EFSM. For instance, if there are fourteen variables, each with ten possible values, there are at least $10^{14}$, or 100 trillion, possible paths through the EFSM. This is an unwieldy number of paths to generate, and would consume an enormous amount of computer time, both to generate the paths and to run the resultant tests. Even greater numbers are possible where loops are created with large numbers of iterations. Where a routine is recursive and there are no internal limitation on the number of times it may call itself, the number of paths may in fact be infinite.

To avoid such situations, execution constraints may be placed on the process of generating paths. Thus, if a loop exists with a large possible number of iterations, the user may specify a constraint for that loop of, say, three iterations, so that values for variables generated in the loop may be tested, without testing every possible iteration of the loop.

Similarly, means are provided for flagging unconstrained recursions. During execution of the path generation program, any path with an unlimited recursive call would be identified, and either no paths would be generated including that recursion, or a limited number of recursions (perhaps one or two) may be executed, so that at least some paths are generated which include the recursive call.

Execution constraints are more important in the design of state-rich models, and are discussed in detail in applicant's PFL application.

As the transformation according to stage 4 proceeds, any tests which are encountered (like Boolean tests) are flagged by the addendum of a "%verify" prefix. The purpose of this is explained in the discussion of Method Stage 5, following. An example of a "%verify" statement in the specification for "sample" appears in Appendix E, which is discussed in detail in Section V below.

The result of the path traversal stage is a set of path files. For allpaths (exhaustive testing), all paths through the EFSM will be traversed, and one path file will be generated for each of these paths. For edge cover (thorough testing and identification testing), one path file will be generated for each path actually traversed, which will be fewer than the total number of possible paths.

Method Stage 5: Post-process the path files.

The path files form the core of the validation tests. Before they can be used as tests, however, they must be post-processed.

The test statements are flagged with "%verify" because the validation tests based upon the path files must be executed; and the tests cannot be executed unless calls upon which they rely have already been made. Since, in a specification, the tests may be stated anywhere (such as before the related call is defined), this would result in errors, namely the failure of a test because it does not have the required parameter. Thus, in order to ensure that the calls in the test programs occur before the "verify" tests are executed, these tests are flagged during traversal of the EFSM, while the path files are created; and then post-processing is carried out, which involves moving all of the "verify" statements to the end of each validation test program.

To do this, the flagged "verify" statements are collected together in a list. The very last step of the transformation procedure (method step 1:14) includes a statement ("\nverify;") which is an instruction to dump (list) all of the "verify" tests which have been placed in the VERIFY list. The word "verify" is stripped from each of the "verify" tests, so that they now constitute implementations of the tests in the specification. The sets of "verify" tests (a unique set for each generated path) thus appear at the ends of the path files. When validation test programs are built using these path files (see Method Stages 6–8, following), the "verify" tests appear as conditional statements in the programs.

An alternative method is to append the word "verify" to each test in the specification as it is encountered, and build a list as the specification is transformed (per the transformation method of Appendix C). Each "verify" line in this list is then correlated to the edge to which it pertains. Then, at the end of the transformation, a series of new states is created, one for each of the "verify" tests. This series of states is added to the EFSM for each of the tests generated by the path generator. Each state is connected to the previous state by two edges, with opposite predicates. One predicate will be something in the form of "P: edge__X__was__taken", and the other will be its opposite, as "P: !edge__X__was__taken". The first of these edges includes the test which pertains to a path including edge X, and will be taken only if the edge X was taken. Thus, only those generated paths which include edge X will run the test attached to the edge to which "P: edge__X__was__taken" is also attached. This ensures that a given test cannot be made if its prerequisite call has not been made.

Note that this alternative method results in the concatenation of the same set of edges and states at the end of all the EFSMs that are generated, and that these additional edges include all of the "verify" tests present in the specification. If a specification includes twenty such tests, then twenty states connected in series via forty edges (two to each state) will be added at the end of each test.

Typically, the majority of the predicates will fail for a given test; i.e., each generated path will be likely to include only a small subset of the edges resulting from the "verify" tests.

Method Stage 6: Create Program Shells

The path files generated in stage 4 and post-processed as necessary in stage 5 are in the form of source code representing the paths taken through the EFSM. This source code is in C or whatever other language is specified. In stage 6, each path file is inserted into a program shell that also includes the actual implementation to be tested.

An example of such a program shell for the routine "sample" is illustrated in Appendices M (the beginning of the shell) and N (the ending of the shell). Thus, each test program constitutes an actual C language program consisting of the program shell fragments coupled with one path file. Each such validation test program includes an executable call to the implementation to test its consistency with the specification for the set of data relationships represented by that program.

The program shells are automatically generated by the method of the invention, and have certain required sections. Since the point of the validation tests will be to verify the correct execution of an application, there must be some feedback to the user as to whether each test failed or not.

The program shell includes:
 the beginning of the shell (such as Appendix M); and
 the ending of the shell (such as Appendix N).

Each path file is inserted between one pair of these shell portions to generate the validation tests; that is, each validation test includes the shell beginning, followed by a single path file, followed by the shell ending.

The program shell is responsible for initializing the variables to be used by the implementation, which is called by each path file. The portions of the program shell are:

1. a definition for a routine (here called "verify_failure") that provides an output indicating when an implementation has failed, i.e. does not comply with the specification;
2. a definition for a routine (here called "pick_range") which selects values to variables in ranges determined by partitions reflecting value assignments for the respective variables. For each parameter with a range partition defined in the parsed specification, there will be an edge in the resultant EFSM corresponding to that range. For each such edge, a single "pick_range" statement is generated in each path file containing that edge. The "pick_range" routine may be exactly as appears in Appendix M, or may be some other routine for selecting values in the correct ranges.
3. a random number generator routine, preferably, to provide a seed for the "pick_range" routine, so that the values selected within the different ranges are otherwise random. Such a routine for the C language running in a UNIX environment appears in Appendix M.
4. a "main" portion. This portion begins in the first portion of the program shell, includes a path file, and concludes in the second (ending) portion of the program shell.

The beginning of the "main" portion of the program shell initializes a variable called "test_result", which is a test failure flag appearing in each path file (as in Appendices J, K and L). It also includes a type declaration for a variable having a name of the form "<name.of.routine>_result", which also appears in each path file. Thus, for the routine "sample", this becomes "sample_result". The use of these variables is discussed below. Note that these variables could be declared before the "main" section, in which case they would be global instead of local.

The type declared for "<name.of.routine>_result" will be the same as the return type of the tested routine. Since the specification for "sample" (Appendix M) indicates an integer return type, "sample_result" will be declared as an integer in the program shell. It will be used as global variable containing the result of making a call to the implementation from each validation test, and its value returned to the test program. It may be then be used for other purposes, for instance as input to one or more tests later on, which might rely upon the outcome of this particular test.

5. an ending portion (see Appendix N) containing an if-then-else section; if test_result is 0 (or whatever value was selected in the specification), then the program is to print out a "success" message, and otherwise it will print out a "failure" message.

The requirements of the program shell are clarified in the discussion of the example routine "sample" under Method Stage 7, below.

Method Stage 7: Couple Test Programs with Program Shells to Create Validation Tests This stage involves creating a copy of each of the first and second portions of the program shell for each path file, and joining them together with that path file to form a complete validation test program. There will thus be one such program for each path file generated in the traversal of the EFSM. An example of a complete test program would be: Appendix M, followed by one path file (Appendix J, K or L), followed by Appendix N.

Method Stage 8: Execute

Stage 8 is the actual execution of these test programs. This is accomplished simply by making a call to the name of each validation test. The output of the tests will be messages indicating failure or success of each test. The tests that failed are thus flagged, and by inspection of those tests one can immediately determine which paths included erroneous program segments. This leads to efficient debugging, all accomplished automatically by using the specification as the only hand-generated input.

Appendix O shows the steps one would go through to manually build and execute validation tests for the routine "sample" defined in the specification of Appendix E, given: the three path files (Appendices J, K and L); the two program shell portions (Appendices M and N); and two example implementations of the specification of Appendix E. These two implementations (Appendices F and G) are named "sample_good.o" and "sample_bad.o". The first of these is designed to implement the specification correctly, by returning a 0 if and only if a=2. The second is designed (for exemplary purposes) to function incorrectly, by returning a 0 even if a>2. The "sample" routine is discussed in Section V below in greater detail.

The steps to building the validation tests include:
(1) compile the implementation(s) to create implementation object files;
(2) create test source code files by concatenating the program shell portions with each of the path files;
(3) compile these test source code files to create test object files;
(4) link each test object file with each implementation object file to create test images; and
(5) execute the test images.

These steps can be carried out by keying in the commands if there is a limited number of tests. However, for general purposes it is an easy matter to carry them out automatically.

III. The Interface Specification Language (ISL)

ISL is applicant's preferred language for expressing the specification. Other languages may be developed and used, as long as they fulfill the functions necessary to support the parsing and transformation procedures described above; the criteria necessary for construction such a language are discussed below. When reference is made herein to "ISL", it may be taken to mean any language meeting the criteria discussed below that enable the procedures of parsing, transformation and automatic generation of validation tests. Data segments in ISL are generally named according to C's "lvalue" syntax, allowing for pointer, array and structure-member references.

Appendix A lists ISL keywords, and Appendix B presents the ISL Backus-Naur Format (BNF). The primary constructs of ISL are those describing data types and API entry points (or routines).

Appendix D, the user's guide for ISL, gives detail sufficient (in combination with Appendices A and B) to generate source listings suitable for automatic parsing, transformation and ultimately generation of validation tests. Referring to Appendix D, Section 1.4, an ISL source file (such as Appendix Q) includes the following sections:
A. Property Section(s) (optional), including a comma-delimited list of symbols that will later be used in the parameters section(s) as constraints or in the values section(s) to declare a characteristic that parameters may have.

B. Constant Section(s) (optional), essentially the same as conventional constant sections in a standard header file.

C. Type Section(s) (optional). This syntactic unit contains the following:
  1. the name and syntactic form of the type. This is a C declaration for the named types, which are user-specified. It may be a numeric enumerated, structure or union type, or some other type.
  2. specifications for fields for structure and union types. This section is similar to the parameter-definition section for routines (see D.2 below). It is used to describe the characteristics and relationships of the field members.
  3. a value-relationship section, similar to the value-relationship section of a routine (see D.3 below).

D. Routine Section (required), the heart of the ISL listing. It includes the following subsections:
  1. Syntax (required), including information found in conventional header files, including the name of the routine, a description of the syntax (format) of the routine and declaration of the data type of the routine and the data types of its parameters. This is (in the preferred embodiment) a C declaration of the routine.
  2. Parameters (optional), describing the characteristics of the parameters and groups of parameters declared in the Syntax section.
  3. Values (optional), describing the relationships among the parameter, and between parameters and the routine.

The Parameters subsection (D.2) of the Routine Section defines characteristics falling into three different categories (see Appendix D, Section 1.4.4.2):

D.2.a. I/O status. specifying the relationships between parameters and the call format, including whether a parameter is for input, output or both, and whether a value must be supplied for a particular parameter. The I/O status may be one of three types:
    (1) INPUT, indicating that the parameter is used to pass data into the routine;
    (2) OUTPUT, indicating that the parameter is used to return data from the routine; or
    (3) INOUT, indicating that the parameter is used to pass a value into the routine, where the value may be updated and passed back out.
  D.2.b. Optional/Required status, including:
    (1) OPTIONAL, indicating that the parameter is always optional;
    (2) REQUIRED, indicating that the parameter is always required;
    (3) REQUIRED_IF, indicating that the parameter is required if a specified circumstance is true. The parameter may be present if that circumstance is not true.
    (4) REQUIRED_IFF, indicating that the parameter is required if and only if a specified circumstance is true.
  D.2.c. Parameter (or value) constraints, expressed as Boolean expressions or using ISL operators (see table below), defining restrictions that may be placed on parameters. Constraints may be placed on relationships between parameters, such as how the structures and values of some parameters affect the structures and values of other parameters, and how specific parameter/data combinations map to specific output results and actions. Thus, constraints may restrict a given parameter to having values within a defined range, or one of a list of values, a mask of values, a specific type or property, or a function of another parameter value. Operators for imposing parameter constraints include length, choice, range, mask, present, mask_contains and has_prop, defined as follows (see Appendix D, Sections 1.4.4.2 and 1.5):

ISL OPERATORS

| Keyword | Syntax | Operator Definition |
| --- | --- | --- |
| has_prop | has_prop(A,B) | A has the properties of B |
| type | type(A,B) | A has the type of B |
| range | range(A,x,y) | Range of A is x to y |
| present | present(A) | A is required to be present |
| choice | A=choice(x,y,...) | A may be one of x, y, etc. |
| mask | A=mask(x,y,...) | A is mask of values x, y, etc. |
| length | A=length(B) | A is length of B |
| mask_contains | mask_contains(A,B) | A bitwise AND B is nonzero |

These operators are used in ISL with a % symbol, as will be seen from the ISL source listings in Appendices E and Q, and have functions as follows:

The has_prop operator assigns a named property to a data segment (parameter). The semantics of the named property are defined externally to ISL, typically in the context of a test execution environment, such as C.

The type operator ascribes to a parameter the semantics of a type other than the one given in the syntactic description.

The range operator restricts the value of a parameter to a specified numeric range.

The present operator requires the specified parameter to be present.

The mask operator restricts the value of a parameter to a subset of specified bitmasks, connected together with the OR operator, and hence performs a bitwise OR on the parameter.

The length operator requires the specified parameter to have the length of the parameter appearing in parentheses.

The choice operator restricts the value of a data segment to one of a set of specific values.

The mask contains operator requires that a bitwise AND of the first subsidiary expression and the second subsidiary expression be nonzero, hence that former includes the latter.

These and additional operators are defined in detail in Appendix C.

As specified in Appendix D, the ISL User's Guide, other types of operators used to define parameter constraints include:

relational operators (used in conventional C fashion):
=, ==, !=, <, >, <= and >=

Boolean operators:
||, && and ! (OR, AND, NOT)

The Values subsection (D.3) of the Routines section utilizes a list of operators similar to those used by the Parameters subsection (D.2), and in addition use keywords unique to the Values subsection, namely IF, ELSE and VERIFY.

IV. Output

ISL implements procedures that generate EFSMs, validation tests, and documentation. The generation of EFSMs and validation tests is discussed above (see Sections II/Method Stages 3 and 4–8, respectively). As mentioned, the documentation is produced in a conventional manner using an application such as nroff.

A. Graphical Representation of EFSMs: Path Flow Language

An EFSM is represented internally as a set of objects representing states and transitions between states, with the transitions including predicates, parameter constraints, events, actions and tests (e.g. Boolean tests). The EFSMs are no longer expressed in ISL, though ISL was the starting point when the original specification was generated. Rather, the EFSMs are expressed in applicant's Path Flow Language (discussed above) or another suitable language.

While these EFSMs may be displayed graphically, that is not necessary for the generation of tests of the implementation. The graphical interface for creation and modification of EFSMs is described in the STE User's Guide attached as Appendix B to applicant's aforementioned copending PFL patent application.

Figure 2:
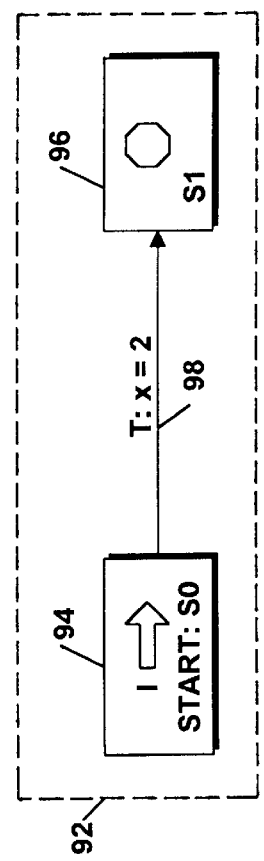
FIG. 2 is an state diagram of a simple example of an extended finite state machine (EFSM).

An example of a graphical representation of a simple EFSM 92 is shown in FIG. 2, with start state S0 (box 94) and exit state (box 96) connected by a transition 98. State S0 may also be referred to as a "vertex", as may the exit state; generally, the term "state" will be used herein to refer to the abstract state of the EFSM, i.e. the values of variables, stacks, etc., while the term "vertex" will be used to refer to the symbol in the figures. However, they may be used essentially interchangeably.

Vertex 94 may represent a state where a variable x is as yet unassigned. Transition (or "edge") 98 may represent an assignment (which is identified as test data, denoted by the "T") of x=2. The exit vertex 96 then represents a state where x has a value of 2. Note that the arrow on transition 98 proceeds from vertex 94 to vertex 96, indicating that the flow is in that direction only.

This example, while very simple, represents the pattern of the graphical representations of EFSMs discussed below. In those representations, a start state has the appearance of vertex 94 (or vertex 200 in FIG. 5), and an exit state has the appearance of vertex 96 (or vertex 208 in FIG. 5). Intermediate states have a symbol with a two-way arrow in a box, such as vertices 201, 202, etc. Transitions in the EFSMs of FIGS. 5 and 6A–6B are represented as arcs or lines, with an arrow indicating the direction of flow and the decimal indicating the vertex to which the arrow points; thus, arc 200.1 extends from state S0 (vertex 200) to state S1 (vertex 201) in FIG. 5.

Figure 5:
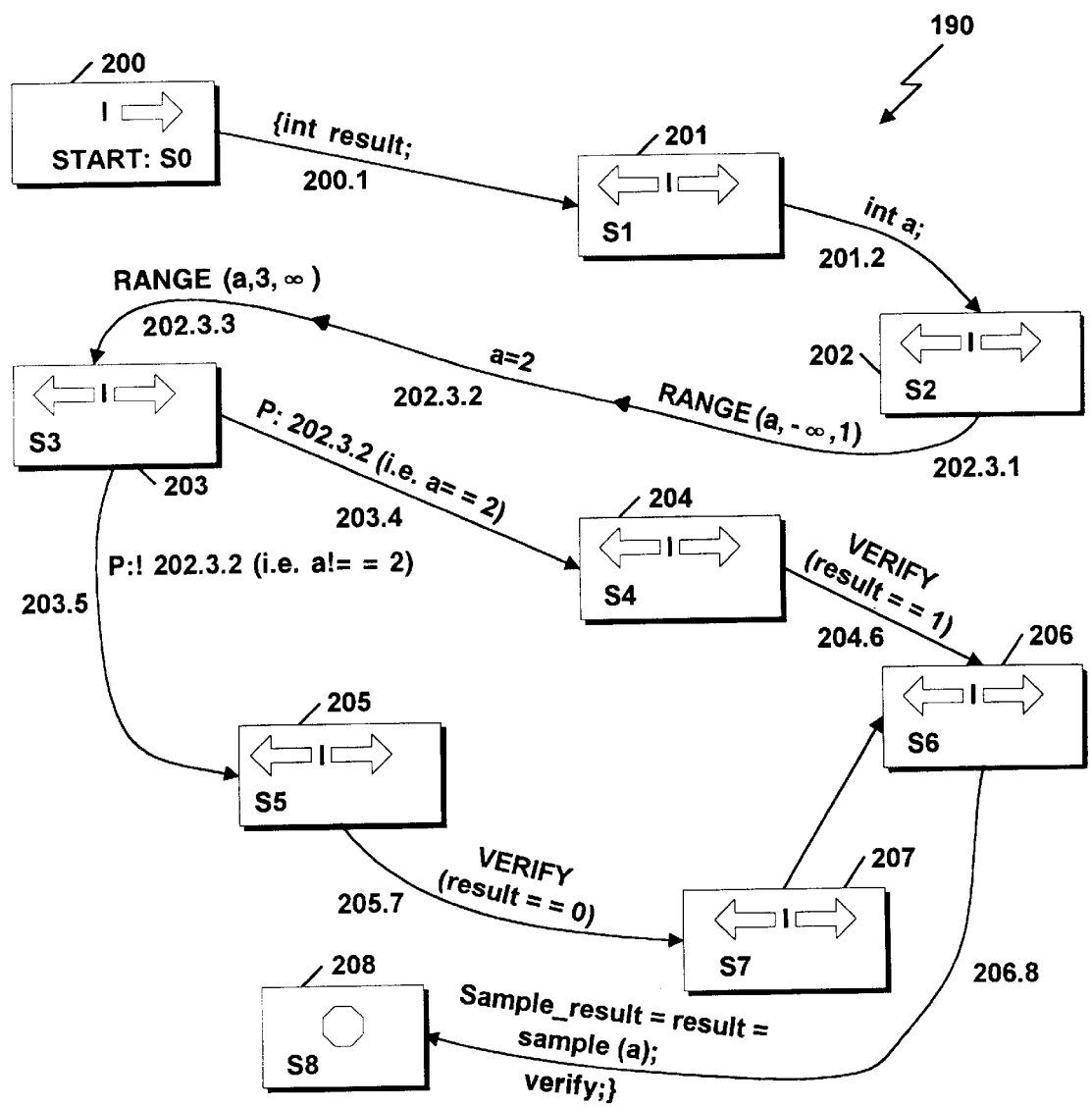
FIG. 5 is a state diagram of and EFSM generated by the procedure of FIG. 3 for a sample program as specified in Appendix E.
Figure 6A:
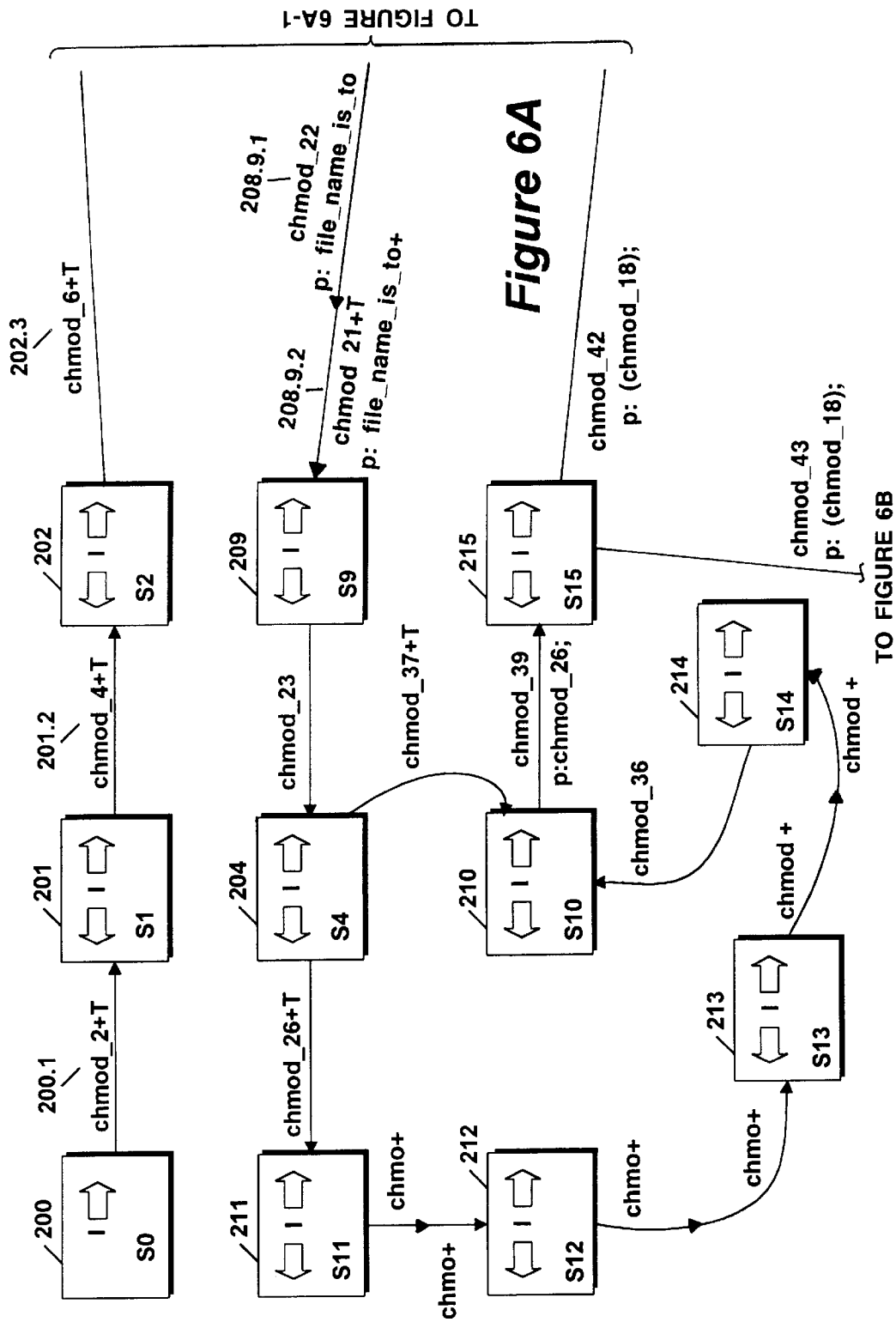
FIGS. 6A–6B together form a state diagram of an EFSM generated by the procedure of FIG. 3 for the POSIX "chmod" (change mode) function.
Figure 6B:
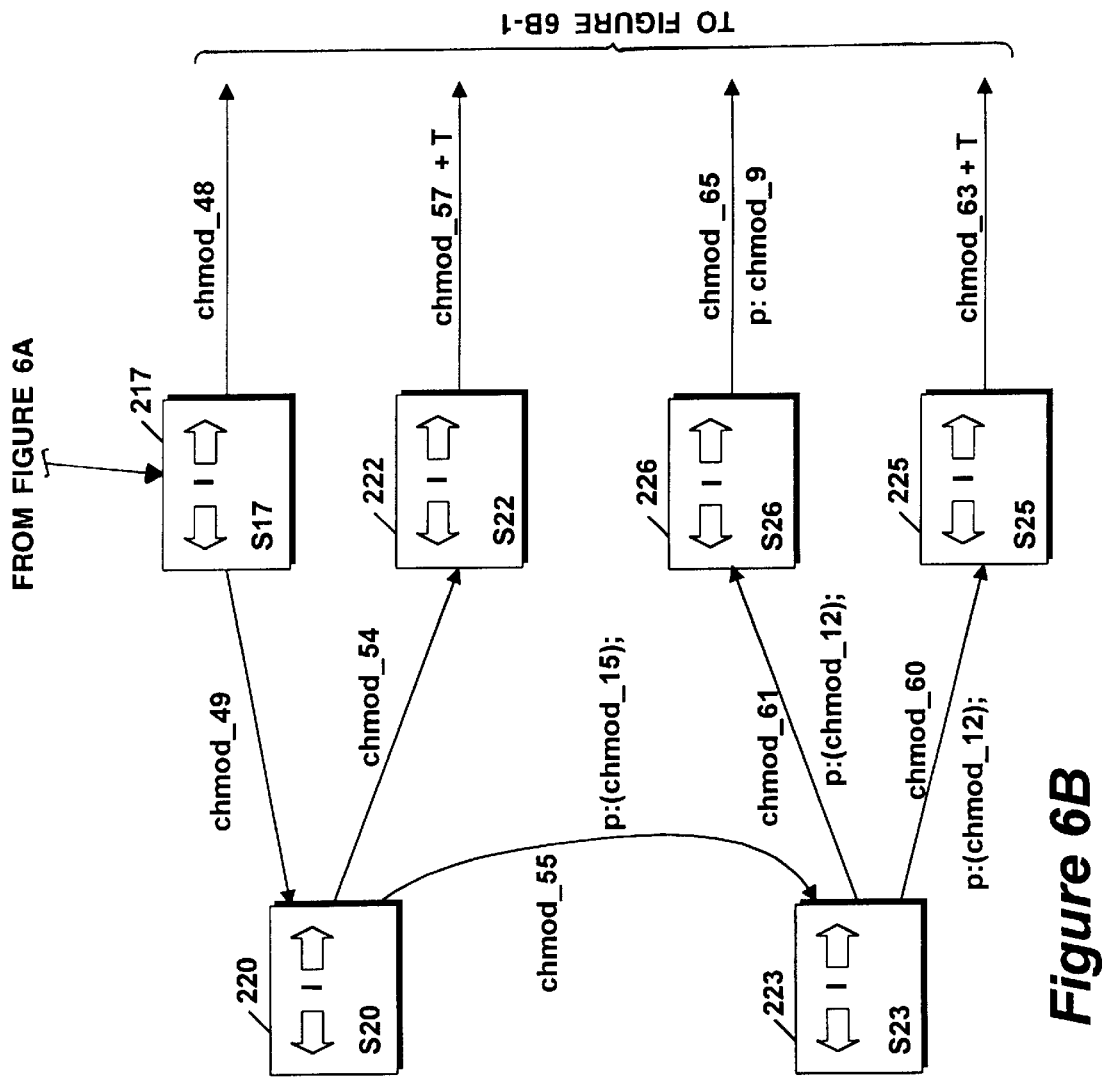
Figures 1, 6A:
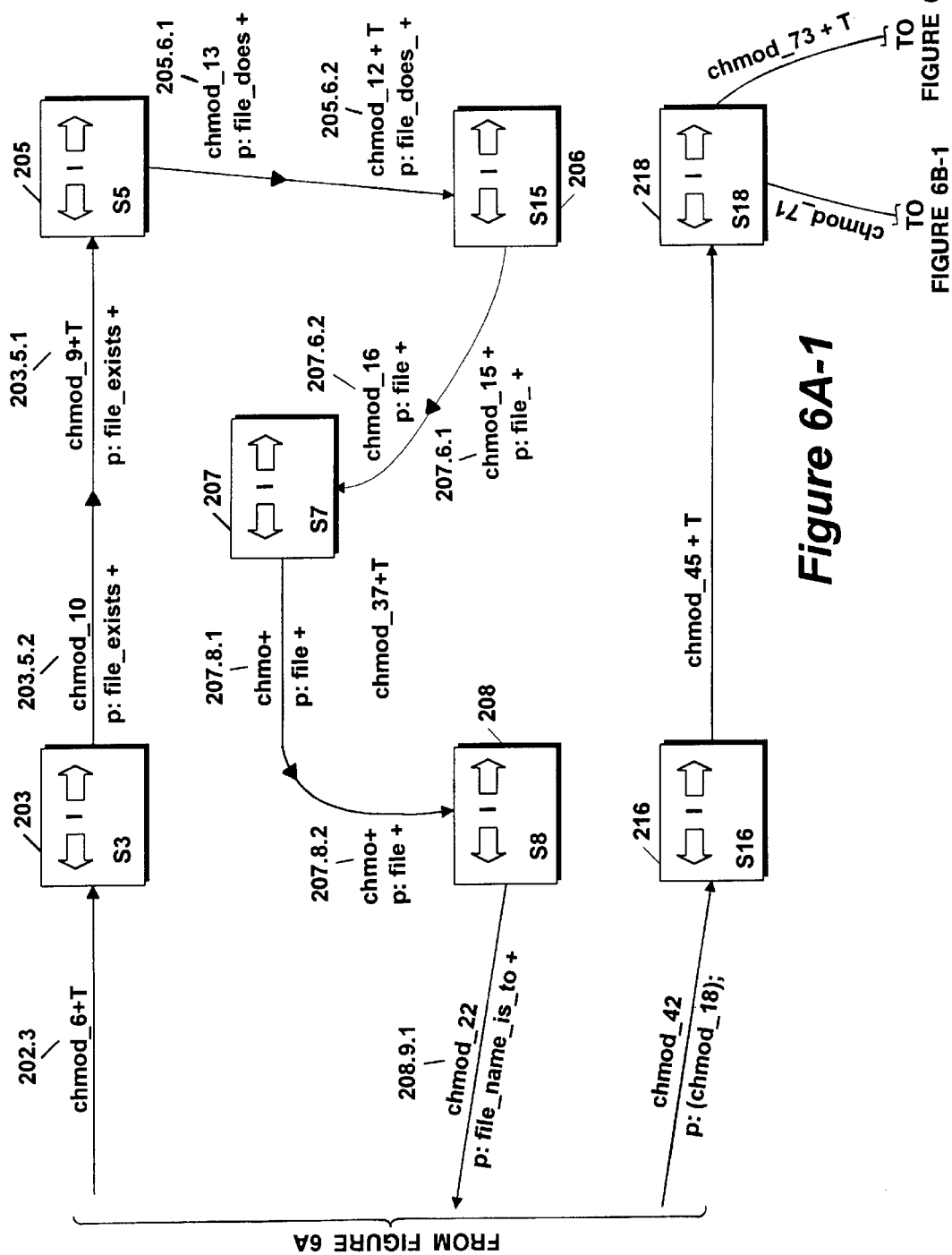
Figures 1, 6B:
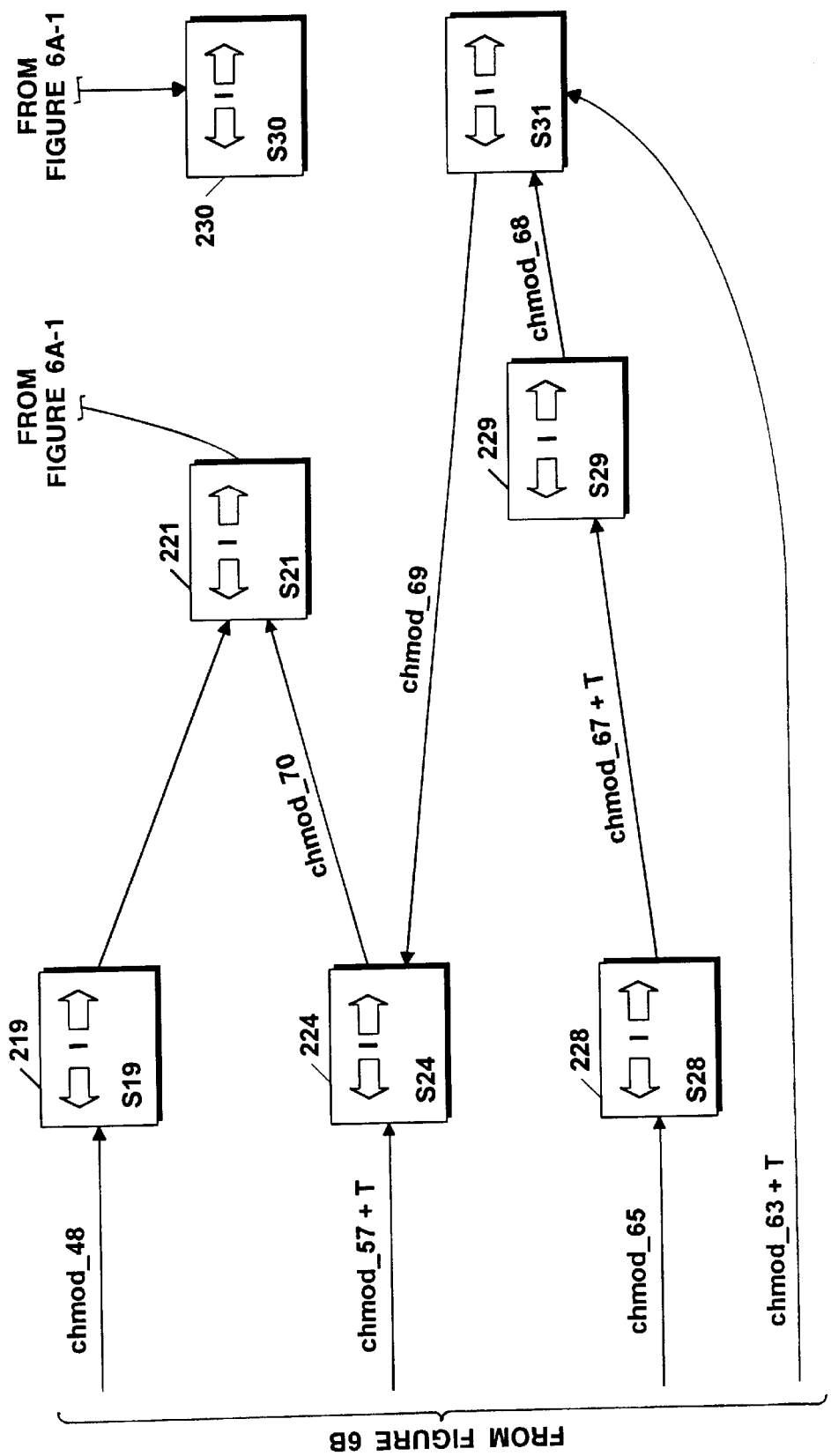

If there are two or more alternative paths which may be taken between a given pair of states, they will be represented as consecutively placed arrows, as with transitions 202.3.1, 202.3.2 and 202.3.3 in FIG. 5 (the second decimal indicating which of the arcs is referred to). This occurs where different paths are taken depending upon whether a condition is or is not satisfied; or where a variable is assigned one of two or more values; and in other situations.

Along the transitions may appear any of appear the abbreviations A (for an action), C (for a constraint), E (for an event), P (for a predicate) and T (for test). In the examples herein, however, illustrations only of tests and predicates are shown. The other types of annotations (see the Introduction above) are more appropriate to representation of a state-rich problem, as in applicant's copending PFL patent application.

B. Path Files: the Validation Tests

When the EFSM representing the specification is traversed as described in Section II/Method Stage 4, a "%verify" statement is created for each test encountered, e.g. each "if" statement annotated to an edge in the EFSM model. These statements are concatenated at the ends of the path files, as described for Method Stage 5. The validation tests are then built up, as described for Method Stages 6–8, using the program shells. These tests are in the C language in the present examples, but may be in any language desired by the user; the only requirement is that the annotations (test data) be expressed in the target language (which is controlled by the transformation).

Validation tests include the following elements:

1. a type declaration for "result", the type being determined by the specification.
2. type declarations for any parameters (if any) of the routine being tested, the types being determined by the specification. These may be declared before or in the "main" portion (see below).
3. assignments of values to the parameters (if any) of the routine being called, including the "pick_range" statements (see Section II/Method Stage 6, above).
4. a statement to make the call to the routine being tested and assign the result to a variable "result", the statement basically of the form:

routine.name_result=result=<routine.name(parameters)>

For "sample", this becomes:

sample_result=result sample(a)

The variable "result" is used locally in the validation test, while "sample_result" may be used globally. (This could, in this case, be replaced by the single statement sample_result=sample(a), but there may be reasons for wanting to keep the variables "result" and "sample_result" separate.)
5. For each "verify" statement encountered in the traversal of a path (in the creation of path file), an "if NOT" statement is ultimately created to generate failure reports. An example may be seen in Appendix I; the routine if (!(result==0))
   test_result=1
   verify_failure("result==0");

is used to generate a value for test_result of 1 if the result of calling the implementation under test fails, i.e. returns a value for result of which is not 0. (It also utilizes the verify_failure routine, which is defined in the first part of the program shell, to print out a failure message in the case of an incorrect implementation.)

C. Documentation

ISL provides a facility for passing ASCII text in the source directly through to the documentation. This documentation can completely replace the handwritten nroff source now in use.

Since the ISL source comments are in English (or some other natural language) and are by design unambiguous, documentation can be produced automatically for any specification expressed in ISL. This eliminates the burden of manually creating documentation and updating it when the specification changes. In applicant's current embodiment, documentation throughput is hundreds of manual pages compiled per second into nroff source.

V. Testing an Implementation of an Example Routine: "Sample"

Appendix E is a specification, expressed in ISL, for the "sample" referred to above, which shall be used to illustrate the method of the invention. Its function is simply to accept an input for the variable "a", and to return a result of 1 if a=2, but otherwise to return a result of 0.

"Sample": Stage 1—Create Specification Source Code.

The specification of Appendix E represents the result of Stage 1 of the method of the invention (see Section II above). It has been created in ISL, so it is ready to be automatically parsed and transformed. If it had been written in ordinary English, it would have to be coded into ISL.

Appendix E includes the ISL components set forth in Section III.D above namely a Syntax section, a Parameters section, and a Values section. This particular specification does not require the Property, Constant and Type sections (see Sections III.A, B and C above).

The Syntax section includes a declaration of the type of result to be returned by the routine, in the statement:

int sample(int a)

This indicates that the "sample" routine takes an integer "a" as input, and returns an integer result.

The Parameters section states that the input "a" is required. Finally, the Values section states that if the input value of "a" is 2, then the routine should return a result of 1; otherwise it should return a result of 0.

The %verify statements at the end of the specification of Appendix E flag strings that will be used as test statements in the validation test programs created at the end of the overall procedure, as explained in Section II/Method Stage 5, above.

An implementation of the specification of Appendix E must: (1) accept the integer input "a"; (2) test whether it is equal to 2; (3) if it is equal to 2, return 1; and (4) if not, return 0. An example of such a program, written in C and entitled "sample_good.c", appears in Appendix F. This program can be tested for consistency with the requirements of Appendix E in the manner discussed below.

Another example implementation of Appendix E, entitled "sample_bad.c", appears in Appendix G. It is immediately apparent that the implementation in Appendix G does not meet the specification requirements of Appendix E: this implementation returns a value of 1 if "a" is equal to or greater than 2, whereas the specification requires a result of 1 only if "a" is exactly 2. Thus, "sample_bad.c" should produce an error result when tested by the invention. That this occurs is demonstrated below.

"Sample": Stage 2—Parse the Specification Source.

The entire specification of Appendix E consists of a Routine definition. To parse this, we refer first to section A of Appendix C. Item 1 identifies the name of the routine; thus, line 1 in the parsed specification of "sample" (see Appendix H) reads "is named sample".

Line 2 of A: Routine in Appendix E identifies the datatype of the routine's output, and thus all lines beginning with "2" in Appendix H relate to the datatype. Type is covered in section B of Appendix C. Line 1 under Type identifies the name of the type; thus, line 2.1 in Appendix H identifies the name of the output for "sample" (in this case, it is not assigned a name). The return is classified as an integer (line 2.2), as required in the specification (Appendix E) in the "int sample" declaration.

Lines 2.3–2.4 indicated that the integer is signed and occupies four bytes. This is standard for a C integer. Items 5–7 under Type in Appendix C (associated types, structure or union, constraints) do not apply here, so there are no corresponding lines 2.5–2.7 in Appendix H.

Item 8 of the Type description refers to partitioning; since the variable "a" will have a partition associated with it, due to the testing of its value (a=2 or not), we proceed to Section I of Appendix C: Partition. All lines in Appendix H beginning with "2.8" will thus relate to this partition. Partitions for the testing of different values for variables will be familiar to those knowledgeable in the area of software testing. Basically, enough partitions are created to test all ranges of values for the variable; here, since a=2 is tested, we will test results when a<2, a=2 and a>2. This results in a three-way divided partition, and in the EFSM to be constructed will result in a different path for each of the three possibilities. This will become clear in the discussions below of the transformation of the parsed specification and the traversal of the resultant EFSM to generate path files.

Line 2.8.1 indicates that the partition is classified as a range partition, corresponding to Appendix C/Section I/item 1 (discussion of classification). Line 2.8.2 has no entry, because Appendix C/Section I/item 2 does not apply to a range partition. Item 3 does apply, though, as does item 4; so corresponding lines 2.8.3 and 2.8.4 specify the low and high boundaries of the range partition. Items 5–9 of Appendix C/Section I do not apply.

This finishes the "type" section of the parsed listing in Appendix H, i.e. the section having lines beginning with "2". We proceed now to item 3 of Appendix C/Section A, to create a parsed listing of characteristics relating to field groups of the routine; this generates the lines in Appendix H beginning with "3".

There is a single variable under consideration in the "sample" specification, namely "a", and thus there is only one field group. Item 3 under Appendix C/Section A contemplates the more general situation of a list of field groups; effectively, "a" constitutes a list of a single field group. Line 3.1 in Appendix H indicates that "a" is the first field group in the list of field groups. (Since there is no second field group, there are no lines beginning with "3.2".) Line 3.1.1 refers to the first field in the first field group in the list of field groups, which is still "a". Since there is no second field in this field group, there are no lines beginning with "3.1.2".

Now referring to Appendix C/Section D (fields), the first characteristic (item number {1}) encountered is "name"; thus line 3.1.1.1.1 in Appendix H identifies the name of the current field, namely "a". The second characteristic (item number 2) is "type"; and thus all lines in Appendix H beginning with "3.1.1.1.2" relate to the type of "a". Since "type" has its own section (Section B) in Appendix C, the parsing proceeds thither.

Item 1 under Section B: Type is "name", so Appendix H/line 3.1.1.1.2.1 indicates the name status for "a" (unnamed). Section B/items 2–4 related to type, size and sign, namely integer (line 3.1.1.1.2.2), four bytes (line 3.1.1.1.2.3) and signed (line 3.1.1.1.2.4), respectively. Again, Appendix C/Section B/items 5–7 do not apply. Item 8 (partition) applies, and all lines in Appendix H beginning with "3.1.1.1.2.8" relate to the partitioning of "a".

Since "partition" has its own entry in Appendix C (Section I), we refer to it now. The first entry (item 1) relates to classification, so Appendix H/line 3.1.1.1.2.8.1 indicates this characteristic for "a", namely "divided". Again, Appendix C/Section I/items 2 does not apply.

Appendix C/Section I/items 3–4 indicated the high and low boundaries for the partition, leading to Appendix H/lines 3.1.1.1.2.8.3 and 3.1.1.1.2.8.4. Items 5–7 do not apply.

Appendix C/Section I/item 8 refers to a list of partitions. Since the partition in question is divided three ways, there are three segments to the divided partition. Thus, each line in Appendix H beginning with "3.1.1.1.2.8.8" relates to these segments. We now proceed again to the beginning of Section I to identify the characteristics of each of the partition segments.

The first of the segments (referred to as the first subsidiary partition) is treated at lines 3.1.1.1.2.8.8.1 et seq., the terminal "1" indicating that this is the first subsidiary partition. Lines 3.1.1.1.2.8.8.1.1 through 3.1.1.1.2.8.8.1.4 treat the range of this partition, which will be from the lowest expressible integer to 1.

Lines 3.1.1.1.2.8.8.2* (i.e., all lines beginning with "3.1.1.1.2.8.8.2", the * being a wild-card character) and lines 3.1.1.1.2.8.8.3* similarly define the characteristics of the second and third subsidiary partitions. Note that the second subsidiary partition has a value of 2, and the third has a value of at least 3 and at most the highest integer that may be expressed. The three subsidiary partitions thus cover all the desired values around 2: less than, equal to, and greater than.

This completes the definition of the "type" characteristic of the first field, i.e. item 2 under Appendix C/Section D (field). We now proceed to item 3 (input status); since "a" is an input argument (see the specification in Appendix E), line 3.1.1.1.3 of Appendix H reflects this. Similarly, line 3.1.1.14 indicates that the input is required, corresponding to item of Appendix C/Section D.

As mentioned above, since there is only one field, there is no entry for 3.1.2. Instead, we proceed to item 4 under Appendix C/Section A (Routine), namely the optional statement of data relationships. The specification of Appendix E has such a statement (in the "Values" section), and all lines in Appendix H beginning with "4" result from this section.

Since "Statement" has its own entry in Appendix C (Section E), we refer to it in building lines 4* in Appendix H. Item 1 relates to the classification of the statement. In this case, the statement in Appendix E/Values section is a block statement, having several subsidiary statements, as reflected in Appendix H, line 4.1. Appendix C/Section E/items 2–4 do not apply.

Item 5 refers to list of sub-statements of the block statement, and corresponds to Appendix H/lines 4.5*. The first of these is also the last (i.e. there is only one), namely "if (a==2)". Thus, lines 4.5.1* relate to this first substatement, and there are no lines 4.5.2*.

To define the first sub-statement, we go again to Section E: Statement. Item 1 is classification, so Appendix H/line 4.5.1.1 identifies the statement as a conditional branch statement. Appendix C/Section E/item 2 relates to expression; so Appendix H/lines 4.5.1.2* define this statement's expression. Since "expression" has its own heading in Appendix C (in Section F), we now refer to that section.

Item 1 under Section F: Expression identifies the expression's classification. (Expression classifications were discussed above in Section II/Method Stage 3.e/Module M4: Transform Expression, and are defined in Appendix C at pages 4–6.) Since the expression here has two subsidiary expressions, it is Class 2 expression.

Section F/item 2 identifies the expression's operator, which is "==", as reflected in Appendix H/line 4.5.1.2.2. Items 3–9 do not apply. Item 10 relates to whether the expression includes a list of subsidiary expressions, as it does here. The first subsidiary expression will be "a", and the second, the value 2. The first subsidiary expression is defined in Appendix H/lines 4.5.1.2.10.1*, and the second in lines 4.5.1.2.10.2*.

To define each of these, we proceed again to the beginning of Section F: Expression. The classification (item 1) is 0 this time, since the expression "a" has no subsidiary expressions, as reflected in Appendix H/line 4.5.1.2.10.1.1. This expression has an operator (see Section F: Expression/item 2), namely the FIELD operator, as reflected in Appendix H/line 4.5.1.2.10.1.2. Items 3–8 do not apply. Item 9 applies, and identifies the value described by the expression if the classification is 0 and the operator is FIELD; in this case, the reference at Appendix H/line 4.5.1.2.10.1.9 is to "a", which was originally defined at lines 3.1.1.1*.

The second subsidiary expression (the value 2) is similarly treated, at lines 4.5.1.2.10.2*. It is also of class 0 (line 4.5.1.2.10.2.1), it has the NUMBER operator (line 4.5.1.2.10.2.2), and its value is 2 (line 4.5.1.2.10.2.4, corresponding to Appendix C/item 4).

This completes the treatment of the expression "if (a==2)", and thus completes the set of lines 4.5.1.2* in Appendix H. Returning to the list of items under Appendix C/Section F: Expression (and continuing with the treatment under of Appendix H/lines 4.5.1*), the next item, number 3, relates to a statement to evaluate if the branch decision point evaluates as "true". This will be the statement immediately following the expression "if (a==2)" namely "%verify ("result==1")". To define this statement (in lines 4.5.1.3*), we proceed again to the top of Section F: Expression.

Item 1 is classification, so line 4.5.1.3.1 indicates that this is a class 1 expression. It has the VERIFY operator (line 4.5.1.3.2, corresponding to Section F/item 2), and items 3–9 do not apply. It includes a single sub-expression (see Section F/item 10), reflected at line 4.5.1.3.2.10. Referring again to the top of Appendix C/Section F, item 1 is classification, so line 4.5.1.3.2.10.1 indicates that the sub-expression (the string "result==1") is a class 0 expression. Item 2 identifies the operator, namely the STRING operator (line 4.5.1.3.2.10.2). Items 3–4 do not apply, and item 5 relates to the value of the string, namely "result==1" (line 4.5.1.3.2.10.5).

The treatment of the expression "%verify("result==0") at Appendix H/lines 4.5.1.4* corresponds line-by-line to the treatment of "%verify("result==1") at lines 4.5.1.3*. The only difference in the result of the parsing is that the string value of the sub-expression of the former is "result==0", as reflected at line 4.5.1.4.2.10.5.

This completes the definition of the statement under Values in Appendix E, pursuant to the procedure beginning at item 4 of Appendix C/Section A: Routine. Since the Routine section has no more items, this means that the parsing of the specification is complete.

Appendix H thus represents the result of this completed parsing procedure. An actual parsing procedure takes place, of course, internally in a processor, and results in a stored data structure representing the original specification. The listing of Appendix H is used to illustrate this data structure, and need not be produced in the actual operation of the invention.

"Sample": Stage 3—Transform the parsed source.

Now that the parsed source code of Appendix H has been generated, the processor 20 proceeds to transform the parsed code into an EFSM. This EFSM is internally represented, and need not be visually be displayed to the user. However, FIG. 5 is provided for illustration of the method, and is adapted from a screen dump of an EFSM actually generated by the method of the invention. The screen dump upon which the graphical representation in FIG. 5 is based was generated by applicant's State Transition Editor (STE), mentioned above in connection with applicant's other patent applications.

The transformation of the parsed code into an EFSM follows the transformation method (modules M1–M16)

detailed in Appendix C. Appendix I specifies what happens at each stage of this transformation for the specific example in question, the specification of "Sample". References to the transformation method steps may refer to one or both of Appendices C and I, depending on context.

Creation of State S0

Step M1:1 (i.e. step 1 of module M1) creates a starting (entry) state. This appears in FIG. 5 as state S0 (vertex 200). In step M1:2, a return value for the routine is declared, namely "int result". To accomplish this, module M2 (Declare Type) is called. Step M2:1 (determining whether the input type is NULL ) is false. Step M2:2 performs the succeeding steps for each class of type. Steps M2:2.1*, M2:2.2* and M2:2.3* do not apply, since they relate to types pointer, array and void, respectively. Steps M2:2.4* apply, however, and in particular M2:2.4.3, since this is a (standard) integer, having a size of 4 bytes; so a string "int result" is created. (Here, the <input string> is result, as specified at M1:2.) Since the type class is not opaque, indirect or floating point, steps M2:5* and M2:6* are skipped. Thus, when the call to module M2 is complete, the procedure returns to step M1:2 with the string "int result".

Creation of State S1

At step M1:3, another state is created; this isstate S1 (vertex 201) in FIG. 5. At step M1:4, a transition (transition 200.1 in FIG. 5) is created from vertex 200 to vertex 201 (state S0 tostate S1). A program header string, conventionally "{\n" for C, is created at step M1:5, and is added as a test data annotation to the transition created in step M1:4, i.e. to transition 200.1. Then the string created in step M1:2, i.e. "int result", is also annotated to transition 200.1, resulting in the entire string "{n\int result" being a test data annotation to transition 200.1, as shown in FIG. 5. Then, in step M1:7, state S1 is remembered as the current state.

Creation of State S2

Steps M1:8* declare the type of each field in each of the field groups specified in the routine declaration. Here, there is only one field group, and it includes only one field; see the discussion above regarding the parsing of Appendix E (Stage 2), particularly dealing with lines 3 et seq. of Appendix H. At step M1:8.1.1, module M2 is again called, resulting (again at step M2:2.4.3) in a field declaration "int a". Then a new state is created at M1:8.1.2, and a transition to it at M1:8.1.3, resulting in state S2 (vertex 202) and transition 201.2. At M1:8.1.4, the string "int a" is added as test data to transition 201.2. At step M1:8.1.5, state S2 becomes the current state.

Creation of State S3

Steps M1:9* will create state S3 (vertex 203) and the transitions 202.3.1, 202.3.2 and 202.3.3 shown in FIG. 5, which it will be understood are three independent transitions from vertex 202 to 203. (Though they share a common arc in the graphic model of FIG. 5, the fact that they are independent and mutually exclusive transitions is indicated by the three separate arrows and edge identifiers (202.3.1, etc.) along the arc.) Though steps M1:9* begin with "for each field group", there is only one field group here, so this sequence of steps will be executed only once in this example.

At step M1:9.1, the current state (S2) is saved. Referring to Appendix I, it will be seen that no action is taken next until step M1:9.2.4, where module M3 (Transform Type) is called. This modules constructs a section of the EFSM reflecting value assignments. The input string to module M3 is "a", which is represented in the parsed listing (Appendix H) at line 3.1.1.1.1.

Proceeding to module M3, then, there is one type, namely "int", as specified in Appendix H/line 3.1.1.1.2.2. Thus, step M3:1.1 is passed over, since the type is not "pointer". It is determined at step M3:1.2 that the class is "integer", and at step M3:1.2.1 that there is a partition. Therefore, a new state S3 (vertex 203) is created (M3:1.2.1.1), the partition level is remembered (0 to begin with), and is also initialized to 0 (steps M3:1.2.1.2–3).

Module M6 is then called, to create a transition to the new state S3 corresponding to the current partition. The external counter (i.e. partition level) is found at step M6:1 to be 0, so at M6:1.1 the input start state is stored. Since the input partition is a divided partition (M6:2), the partition level (counter) is incremented (M6:2.2). Then at step M6:2.2.1, module M6 is called recursively. The input string is still "a" (from Appendix H at line 3.1.1.1.1), and the input partition is the first partition, which is defined at Appendix H/lines 3.1.1.1.2.8.8.1* and relates to the value range for "a" of -∞ to 1. (Here, ∞ and -∞ will be used to mean the highest and lowest numbers, respectively, that are expressible in the processor in question. For a four-byte integer, the expressible range will be -214748368 to 2147483647, i.e. $-2^{32}+1$ to $2^{32}-1$.)

In the recursive call to module M6, denoted by "M6(2):", the process begins again at the top of module M6. At step M6(2):1, it is determined that the partition level is not 0. Steps M6(2):2, M6(2):3, M6(2):4 and M6(2):5 do not apply, because this partition is not divided, a mask partition, a type partition, or a discrete partition.

Rather, it is a range partition, so M6(2):6 is true. A transition is therefore created, at M6(2):6.1, going from state S2 to state S3. This will be transition 202.3.1 from vertex 202 to 203 in FIG. 5. An annotation "RANGE(a, <low bound for a>, <high bound for a>)

is created, which is effectively "RANGE (a, -∞, 1)". This is added as an annotation to transition 202.3.1.

Steps M6(2):7–9 do not apply, since the partition is not an expression partition or a property partition, and the partition level (counter) is not zero. Step M6(2):10 is then encountered, and the input ending state is stored as the current state.

This completes the first recursive call to module M6. Since step M6:2.2 specified "for each subsidiary partition . . .", module M6 must be called twice more, once for the partition corresponding to the value a=2 and again for the range (3, ∞). These steps are shown in Appendix I under State 3, immediately following the first recursive call to M6. The execution of steps is virtually identical to that of the first call, and results in transition 202.3.2 bearing the annotation "a=2" and the transition 202.3.3 bearing the annotation "RANGE (a, 3, ∞)". Note that for the second recursive call, instead of M6(2):6*, steps M6(2):5* are executed, since for a single value (a=2) the input partition will be a discrete partition, and the annotation takes the form of an assignment of the input string (a) to the partition value (2).

This completes the call from M3 to M6, which occurred at M3:1.2.1.4. Returning now, and proceeding to M3:1.2.1.5, the new state S3 is remembered as the current state. At M3:1.2.1.6, the partition level is restored to its saved value, namely 0.

The remaining steps in module M3 do not apply, since the class of the type is not struct, union, or indirect. This returns the procedure to module M1, step 9.2.4, from which module M3 was called. Proceeding to M1:9.2.5, the current edge (202.3.3) is stored. It is then determined that there are no more fields for this group (M1:9.2.6). M1:9.2.6.1 is false (there is no value constraint for the field group), as is M1:9.2.6.2 (the field is not "required_if" or "required_iff").

M1:9.3 is also false (the first field is indicated to be required), so this completes execution of steps M1:9*.

At step M1:10, it is determined that the routine specification contains the optional statement (Values), so a call is made to module M5 (Transform Value Statement).

Creation of States S4 and S5

The first step of M5 initializes the end state to NULL. Since the statement type is "block" (there is a single block statement in the Values section in the specification of Appendix E), the subsidiary "then" statement is used as the statement pointer. M5:3 is false (the statement is not NULL).

Steps M5:4* are therefore executed. Step M5:4.1 initializes the condition statement to NULL. Steps M5:4.2–4 are yield "false", since the input statement is not block, empty or simple. Rather, it is conditional (M5:4.5), so the current state is saved at M5:4.5.1, two new states S4 and S5 are created (steps M5:4.5.2–3), and transitions are created from the saved state (S3) to these new states (steps M5:4.5.4–5). State S4 is then stored as the current state (step M5:4.5.6). These steps result in the creation of vertices 204 and 205 and edges 203.4 and 203.5 shown in FIG. 5.

At step M5:4.5.7, module M4 (Transform Expression) is then called, the input expression being "if (a==2)". Step M4:1 is false (the classification of the input expression is not N). Rather, the classification is 2 (M4:2). The operator is none of those enumerated at M4:2.1 (or), M4:2.12 (and), M4:2.3 (has_property), M4:2.4 (mask_contains), M4:2.5 (type), M4:2.6 (pointsto; dot), or M4:2.7 (property). Proceeding to step M4:2.8, at M4:2.8.1 the module M16 (Transform Relational Operators) is called.

Step M16:1 is true, since the operator is "eq" (equals). M16:1.1 is false (the second subsidiary expression is not "choice". Step M16:1.2 is true, since the second subsidiary expression is not "null". Step M16:1.2.1 finds that there is a transition associated with the partition of the expression, so at M16:1.2.1.1 a text string is generated, including the identification of the transition associated with the partition. In this case, that is edge 202.3.2, so a string "202.3.2" is created. (In actual implementation, this string would probably not be "202.3.2", but in any case will be the internal identifier of the transition, such as "sample_7", which would be the seventh object created in the EFSM model of "sample". The transition reference numerals appearing in FIG. 5 will be used here for clarity's sake.)

Step M16:1.2.1.2 is false (the operator of the expression is not "neq"). At M16:1.2.1.3, a return with the text string is executed.

This returns the procedure back to the calling step, M4:2.8.1, which completes the processing under steps M4:2*. Step M4:3 is false, since the classification of the expression "if(a==2)" is not 1; nor is it 0 (step M4*), so this returns the procedure to the calling step for module M4, namely step M5:4.5.7.

Proceeding to M5:4.5.8, a negated version of the string created at M5:.5.7 is created, i.e. "!202.3.2". At step M5:.5.9, the first string ("202.3.2") is then added as an predicate annotation to the transition created at M5:4.5.4, i.e. edge 203.4 going from vertex 203 (state S3) to vertex 204 (state S4). This will mean that transition 203.4 cannot be taken when the EFSM is traversed, unless transition 202.3.2 was also taken.

Creation of State S6

At step M5:4.5.10, module M5 is then called recursively, using the subsidiary "then" statement as input, namely "verify(result==1)". At M5(2):1, the end state is initialized to NULL. Since the subsidiary "then" statement is not a block statement (see step M5(2):2) or NULL (see M5(2):3), these steps yield "false". There is one subsidiary statement (see M5(2):4), so at step M5(2):4.1, the condition statement is initialized to NULL.

The input statement is not block (step M5(2):4.2) or empty (step M5(2):4.3), so these steps yield "false". The input statement is simple (see step M5(2):4.4), so at M5(2):4.4.1 the module M4 (Transform Expression) is called.

Proceeding to module M4, using the expression "verify (result==1)" as the input, steps M4:1 and M4:2 are false, since the classification of the expression is neither N nor 2. The classification is 1, so M4:3 is true. Steps M4:3.1–3.4 are false, since the operator of the expression is not "has_property" or "property" or "present" or "length". It is "verify", so step M4:3.5 holds true, and at M4:3.5.1 a new state is created, namely state S6 (vertex 206). A transition 204.6 is created from the current state S4 to the new state. At step M4:3.5.3, the text string of the subsidiary expression is added as test information to the transition 204.6, as shown in FIG. 5. At M4:3.5.4, the new state S6 is remembered as the current state. The rest of the tests in module M4 (at steps M4:2.6, M4:3.7 and M4:4) are false, so the procedure returns to the calling step M5(2):4.4.1. Step M5(2):4.4.2 is false, because the result of calling M4 at M5:4.4.1 is, in fact, NULL. (Even though a string was created in the call to M4, it is was used only as test data and is not returned; thus the result of calling M4 is null.) At M5(2):4.5, the result is "false" because the input statement is not a conditional branch statement. Step M5(2):5 also yields a "false", since the end state is NULL.

Creation of State S7

This returns the procedure to the calling step at M5:4.5.10. At the next step (M15:4.5.11), the current state is saved, i.e. S6. In step M5:4.5.12, an else statement is determined to be present, and thus at M5:4.5.12.1, the string created in M5:4.5.8 ("!202.3.2") is added as a predicate statement to transition 203.5. When the EFSM is traversed, transition 203.5 will be able to be taken only if transition 202.3.2 was not taken.

Step M5:4.5.12.2 saves state S5 as the current state, and step M5:4.5.12.3 calls module M5 recursively. This call is executed in essentially the same manner as the previous recursive call (at step M5:4.5.10), but using as the input expression the subsidiary "else" statement, i.e. "verify (result==0)". This results in a call to module M4, and the creation of a new state (S7) and a transition to it from state S5 with the annotated test data "verify(result==0)", as shown in FIG. 5.

Returning to step M5:4.5.12.3, the next step (M5:4.5.12.4) creates a transition from S7 to S6. This is to connect up the model, and there is no action taken on this transition.

Step M5:4.5.13 yields a false, since there is an "else" statement present. Step M5:5 also yields a false, and the current state becomes the end state.

Creation of State S8

This returns the procedure to module M1 at step M1:10. Proceeding to step M1:11, an exit state S8 (vertex 208) is created, and at step M1:12 a transition 206.8 is created from the current state S6 to the exit state.

At step M1:13, a string invoking the routine "sample" is created, i.e. "sample (a)". The string "result" has the output value assigned to it, and a variable of the form "<routine.name>_result" has the value of "result" assigned to it. Thus, the string sample_result=result=sample(a)

is ultimately created, and is added to transition 206.8.

At step M1:14, the closing data string "verify;}" is also added to transition 206.8. This "verify" statement is the command mentioned in the discussion of post-processing in Section II/Method Stage 5 above, to cause all the conditional test statements to be concatenated at the ends of the path files when the EFSM is traversed.

The result of Stage 3 is thus the EFSM represented in FIG. 5.

"Sample": Stage 4—Traverse the EFSM.

Traversal of an EFSM stored in memory is a known procedure. In this example, and exhaustive traversal would be used, because the model is so simple and there are few possible paths. In fact, there are only three possible total paths, resulting from the alternative transitions 202.3.1, 202.3.2 and 202.3.5. If transition 202.3.2 is taken, the traversal must proceed by way of transition 203.4, and otherwise by way of transition 203.5; so this juncture does not represent a choice or conditional that would alternative paths. The only possible paths through the model of FIG. 5 are:

Path 1: state S0–edge 200.1–state S1–edge 201.2–state S2–edge 202.3.1–state S3–edge 203.5–state S5–edge 205.7–state 207–edge 207.6–state S6–edge 206.8–state S8.

Path 2: state S0–edge 200.1–state S1–edge 201.2–state S2–edge 202.3.2–state S3–edge 203.4–state S4–edge 204.6–state S6–edge 206.8–state S8.

Path 3: state S0–edge 200.1–state S1–edge 201.2–state S2–edge 202.3.3–state S3–edge 203.5–state S5–edge 205.7–state 207–edge 207.6–state S6–edge 206.8–state S8.

Path 1 corresponds to a validation test to determine whether an implementation returns the correct result if the value of "a" is less than 2. Path 2 tests that implementation with a value of a=2, and path 3 tests the implementation when a>2.

Traversal of these paths yields path files essentially as shown in Appendices J (for path 1), K (path 2) and L (path 3). The only difference will be that, until post-processing, the "%verify" statements will be embedded in the path files, instead of concatenated at the end.

For path 1, traversal of edge 200.1 produces the statement at the beginning of Appendix J, "{int result;". (No action is taken at the states themselves, which are merely markers of the state of the model at those points.) Traversal of edge 201.2 adds the next line, "int a;". Traversal of edge 202.3.1 encounters the first RANGE statement, and the system is designed to convert this into a statement of the form "a=pick_range (-2147283648, 1);". (This may be done at this point or in post-processing.) The "pick_range" function is discussed above in Section II/Method Stage 6 and in Section IV.B.6. Its function is to select a value for "a" between the specified limits. In this case, this would yield an integer value for "a" of 1 or less, which is what is needed to test the implementation for values of "a" less than 2.

Traversal of the next edge, 203.5, does not produce a new statement, since there is only a predicate attached to that edge, and no test data. Traversal of edge 205.7 produces the line "VERIFY (result==0)". Traversal of edge 207.6 does nothing except take the path to state S6, and traversal of edge 206.8 adds the final two lines to the path file, namely:

sample_result=result=1;

verify;}

This last statement is used in the post-processing, below.

The traversal procedure is carried out until all of the paths have been traversed, thus producing three path files. If desired, however, constraints could be placed on the traversal procedure so that only a subset of the possible paths were traversed. In this example, a constraint might be placed such that only edge 202.3.1 or edge 202.3.2 was taken, so that only path 1 or path 3 would be traversed, but not both. This would result in the generation of only two path files for this model, one of which would be for path 2 and the other of which would be for either path 1 or path 3. This type of constraint placement on model traversal can greatly reduce the number of tests which are performed on an implementation, to make the number manageable and to avoid redundancy of tests. Note that in the present example, if such a constraint is used, it would allow the implementation to be tested for a>2 or a<2, but not both (in addition to a=2).

"Sample": Stage 5—Post-process the path files.

The post-processing procedure involves executing the "verify;" statement at the end of each path file. See discussion in Section IV.B.5 above. The post-processing program then goes through the entire path file and extracts all the "verify" statements. From each such "verify" statement, an "if NOT" (i.e. "if !") statement is generated. The argument to the "if !" statement is the result specified in the specification for that circumstance. For instance, for a value of a=1, the specification of Appendix E should yield "result==0". Accordingly, in Appendix J. the "if !" statement becomes if !(result==0)

Appended after this are the statements specified in Section IV.B.5, so that the end of the path file reads:

if !(result==0)

test_result=1 verify_failure("result==0");

Since the expected result is zero (in the path 1), if the result does not equal zero, then the test failure flag "test_result" is set to 1. (This flag will be used later to notify the user whether the test failed.) In addition, the routine verify_failureis called. (This is initialized in the first portion of the program shell, and is discussed below.)

"Sample": Stage 6—Create the program shell.

The program shell to be prepared for this specification includes the elements described in Section II/Method Stage 6 above. Element 1 is a routine called verify-failure,j to provide an output to indicate when an implementation has failed, i.e. does not comply with the specification. This _element is met by a routine definition such as the following:

```
{
void verify_failure(char * string)
    fprintf(stderr, "\n*** Verification failed: %s\n",string);
    return;
}
```

This routine appears in the first portion of the shell program (Appendix M).

When called, it will print out a line indicating to the user that the implementation failed for a given path. The routine verify_failure is defined at the beginning of the shell program, and is actually called at the end of each path file, as noted in the preceding section.

The next element of the program in Appendix M is the definition of the pick_range routine discussed in Method Stage 6. Any routine that picks a number in the correct range will suffice.

The shell program now declares the "main( )" section, and following this is a random number seed generator, to seed the function "random" (or "rand" in other forms of C). This particular section is based upon UNIX functions; any random number generator will suffice for this purpose. In fact, the values supplied to the validation tests needn't be random, as long as they are in the specified ranges as defined by the partitions; but the test is better if the numbers are random.

This completes the first part of the shell program. The second part is to come after the path file, and appears in Appendix N. It includes an if-then-else routine, inspecting the failure flag test_result. If test_result is 1, then a line prints that the test failed. Otherwise, a line prints that the test succeeded.

Many variations on the shell program are possible. The main requirement is to use the result of the call to the "sample" program (which is done in the path file portion of the validation test) to provide feedback to the user as to whether the test succeeded or failed. The first part of the shell program must also initialize pick_range or an equivalent routine, for use also in the path file portion of the test. Finally, as an added feature, the verify_failure routine is initialized so that the path file portion of the test may call it whenever a failure is encountered.

"Sample": Stage 7—Couple the test programs with the program shells to create validation tests The steps taken to build the validation tests are discussed in Section II/Method Stages 7 and 8 above. Appendix O lists the specific steps to be taken in the example at hand, the "sample" routine. The actual implementation(s) must be compiled, creating implementation object files. Each path file must be coupled with a first program shell portion before it, and the second portion after it, and these must be compiled, creating test object files. Then each test object file is linked to each implementation object file, to create test images. Since in this case there are three path files (Appendices J, K and L) and two implementations to test (Appendices F and G), there are six resultant test images.

"Sample": Stage 8—Execute the test images.

Execution is carried out conventionally, and is simply a matter of calling the test images by identifiers such as their names (or by pointers to the tests). This is done automatically by the system of the invention. In addition, any test image may be manually executed by inputting its name to the system, e.g. by typing it in or, in a graphical interface, by clicking on its image.

Following are printouts of results obtained by actually running the automatically generated tests. There are six test results, one for each of the test images mentioned above.

Following are the test run results of the three path files with the "good" implementation of Appendix F:

In sample: a=-517715513
Test succeeded.
In sample: a=2
Test succeeded.
In sample: a=1651642483
Test succeeded.

Note that the test succeed in each case, as expected, and that a takes on three values: one (random) integer less than 2, 2 itself, and one (random) integer greater than 2.

Following are the test run results of the three path files with the "bad" implementation of Appendix G:

In sample: a=-621638006
Test succeeded.
In sample: a=2
Test succeeded.

In sample: a=731740937
*** Verification failed: result==0
Test failed.

In this case, the random integer less than two led to a successful result (i.e. confirmation that the implementation behaved according to the specification). The value of a=2 also succeeded. However, the value of a>2 failed; this is because the implementation of Appendix G returns a 1 for such values, when according to the specification it should return a zero. Thus, the method of the invention has successfully isolated a bug (albeit deliberate) in the implementation. By extension, the foregoing method can automatically isolate any problem with a program arising from inconsistency with its specification, and by the use of appropriate error messages (with parameter printouts, loop index printouts, etc.) such problems can be quickly located and analyzed.

VI. Another Example: "chmod".

A more thorough example, involving the application of the present invention to one portion of the POSIX specification, will now be described: specifically, the portion defining the "change mode" ("chmod") procedure. Chmod is a procedure used to change the access permissions (read, write, and execute) for a file, and is known to essentially all UNIX (POSIX or otherwise) users. While the details of actual use of chmod are not relevant here, the representation of its specification in ISL, and its testing by using compiled ISL, are discussed. The specification for chmod for POSIX appears primarily in section 5.6.4 at pages 106–107 of the ISO/IEC 9945-1 (IEEE) manual mentioned above (Appendix P).

Note that there are many basic functions performed by UNIX operating systems, of which chmod is but one. Others include such standard routines as open, close, read, write, lseek and unlink. The approach to modeling these procedures is essentially the same as that for modeling chmod; the latter was chosen for the following example embodiment because of its relative simplicity. All routines in the POSIX specification can, in fact, be modeled and tested using the present invention, following the procedures described below. The POSIX specification as a whole can itself then be modeled by linking together the EFSMs generated for the individual routines, using global <routine.name_result> variables. The starting point in each case is the specification of the routine.

A. The Chmod Specification Source Code

An ISL source file for a (partial) implementation of chmod appears in Appendix Q. The numerical reference strings accompanying the comments (between /* and */) are explained in Section II/Method Stage 2.

The ISL source listing (Appendix Q) is based directly upon the POSIX specification for "chmod", whose essential elements are described in Appendix P. In the two pages of the latter, some background in standard C syntax is assumed, such as for "int", "char", "path" and pointers denoted by *. These are explained as necessary below, but a C programmer and UNIX user will understand the specification fully in any case.

Background on the POSIX (UNIX) "chmod" Routine

The "chmod" source listing in Appendix Q specifies five properties, the first of which is "file_exists_and_is_accessible". The other four are error conditions specified by chmod (see section 5.6.4.4 beginning at line 818 of Appendix P), namely:

| Property Name | chmod Error Name |
| --- | --- |
| file_does_not_exist | ENOENT |
| file_component_is_not_directory | ENOTDIR |
| file_name_is_too_long | ENAMETOOLONG |
| file_directory_not_searchable | EACCES |

Appendix Q defines three variables: S_IRUSR, S_IWUSR, and S_IXUSR. These variables have associated values for the creation of masks to change user access permissions to files in the conventional manner. They are contained in the standard header file <fcntl.h>, along with others which, for simplicity's sake, will not be used in the present example (such as S_IRGRP for read permissions for a group, and so on).

These three constants have the following associated masks and functions relating to file access permissions:

| Constant | Mask | Function |
| --- | --- | --- |
| S_IRUSR | 100-000-000 | Provide read permission to the owner of the file. |
| S_IWUSR | 010-000-000 | Provide write permission to the owner of the file. |
| S_IXUSR | 001-000-000 | Provide execute permission to the owner of the file. |

(Note that the masks correspond to the octal values adjacent their respective constants in the source listing, namely 000400, 000200 and 000100, respectively.)

The masks are used to change the permissions on files in a bitwise OR process. UNIX (POSIX) permissions appear in the format:

-rwxrwxrwx;

where "r" is for read or copy, "w" is for write (including change or delete), and "x" for execute. These characters may be grouped as follows:

Permissions

| — | rwx | rwx | rwx |
| --- | --- | --- | --- |
| item type | user | group | other |

Thus, the first three letters refer to the user's (file owner's) access permissions, the second three to those of the user's group, and the third for others, outside the group. The first character, here a hyphen ("-"), indicates what type of item it is: a file is designated by a hyphen, a directory by a "d". A hyphen in any position means that permission is denied. Thus, a permission string of -rwxr--r-- means: (1) that the item is a file; (2) that the user has read, write and execute (rwx) permission for that file; (3) that his/her group has only read (and copy) (r--) permission; and (4) that others may also read (or copy) the file.

The masks listed above contain file permission bits, which are used with these permission strings. These bits are set at file creation (by the conventional procedures open, creat, mkdir and mkfifo), and are changed by chmod. For instance, the S_IRUSR mask (100-000-000), when bitwise ORed with "-rwxrwxrwx", produces (with spaces added for clarity):

- r-- --- ---, which gives the user read permission for the file, with all other permissions denied. The other two constants (S_IWUSR and S_IXUSR) would similarly produce, respectively:

- -w- --- --- and - --x --- ---.

These three used in conjunction would result in:

- rwx --- ---, which would allow the user read, write and access permission, and deny all permissions to the user's group and to others. (The "group" and "other" access permissions are accomplished in the same manner, and thus are not discussed in this example, nor included in the source listing of Appendix Q.)

Appendix Q defines the Routine "chmod", and includes three sections: (1) Syntax; (2) Parameters; and (3) Values. Other possible section declarations are: Property; Constant; and Type. See Appendix B at section B.1.3 and Section III.D above.

The first of the three sections in Appendix Q, SYNTAX, is delimited by the keywords SYNTAX and END_SYNTAX. The SYNTAX section describes the data type of the routine, as well as the data types of its parameters. the routine type and name are followed by a comma-separated list of parameter types and names, enclosed in parentheses. See section B.1.3 (page 2) of Appendix B.

In this case, the syntax for chmod, given in the POSIX specification (Appendix P), is:

int chmod (char *path, int mode)

This declaration indicates that chmod is an integer, with a pointer (indicated by the asterisk *) to a character string called path. The pointer is a constant, so it will not be altered by the chmod routine. The other argument for chmod is mode, which is of a type "mode_t" defined in UNIX (or POSIX). While the details are not crucial, it will be seen upon inspection that Appendix Q directly implements the chmod declaration required by POSIX, according to the ISL requirements set forth in the BNF specification of Appendix B.

In the Parameters section of Appendix Q, two parameters are specified: path and mode. These are, as noted above, required by the POSIX specification of chmod, and are therefore included in the ISL source implementing the POSIX specification. Note that path is an input expression, and is required, as indicated in the POSIX declaration in Appendix P, lines 796 et seq. The syntax for declaring path as a required input appears in the ISL BNF of Appendix B, section B.1.4 (page B-5); and see Section III above.

Mode is also a required input, and is so declared in the source listing in Appendix Q. It additionally has a constraint that its value is equal to the bitwise OR of the three constants S_IRUSR, S_IWUSR, and S_IXUSR. The %MASK operator is defined as creating this bitwise-OR value; see section III.D above and the transformation description in Appendix C. As indicated at page 6 of Appendix C, %MASK returns a value constructed by performing a bitwise OR operation on some subset of the expression's subsidiary expressions, i.e. S_IRUSR, S_IWUSR, and S_IXUSR. That is, zero or more of these three constants are used as input values for the %MASK operator and the bitwise OR of the input values is assigned to value. By way of example, if S_IRUSR and S_IXUSR are used as input, a value of 101-000-000 is returned, which corresponds to user permissions to read (and copy) and execute, but not to write or delete.

In the Values section of the Source Listing, there are four concatenated if statements, which are tests to determine whether any of the four error conditions listed above exists (file_does_not_exist, file_component_is_not_directory, file_name_is_too_long, or file_directory_not_searchable). If none of these conditions exists, then the path should have the property "file_exists_and_is_accessible".

The first of these if statements tests whether the path (which is an input argument) has the property of being a nonsearchable file directory. The %HAS_PROP operator is defined in Appendix C under "Class 2 Operators" (page 5). (It may also be a Class 1 operator.) Also used in this if statement is the %VERIFY operator defined in Appendix C under Class 1 Operators, at page 4. This will be used in the testing procedure for the specification to ensure that, when the path is a file directory that is not searchable, it returns the "result" value –1 (meaning that access failed), and assigns the error value "EACCES" to the variable errno. This is in keeping with the POSIX specification of Appendix P at lines 819–821, which states that a value of –1 shall be returned if the chmod routine is unsuccessful, and that errno shall be set to EACCES if search permission is denied on a component of the path prefix.

The other three if statements in Appendix Q also use the %HAS_PROPERTY and %VERIFY operators, and in each case set errno to the value required by the POSIX specification. If none of the if statements is true, this means that none of the error conditions occurred, and the final else statement indicates that the file exists and is accessible. A result of 0 is returned (as required by POSIX upon successful completion).

The other error conditions and results (EPERM and EROFS) specified in POSIX (Appendix P, lines 829–831) are left out of Appendix C, as are certain of the variables (discussed above), in order to keep the example short. Otherwise, the ISL source listing of chmod is complete in Appendix C. The entire POSIX specification, or specifications, may be represented in a source code listing like that for chmod, based upon the ISL syntax and semantics in Appendices A–D.

B. The Parsing of the Source Listing for chmod

The chmod source listing of Appendix Q is parsed in the same manner as was the "Sample" source listing of Appendix E, the result being shown in Appendix R. Referring to the Routine section of Appendix Q, the process commences with a reference to the return type for the routine, which is specified as an integer in the statement "int chmod(char *path, int mode)". This results in lines 2* (i.e. all lines beginning with a "2") in Appendix R, which are similar to the corresponding lines in the parsed "Sample" listing in Appendix H.

Lines 3* in Appendix R treat the field groups, of which there are two: one for "path" (lines 3.1*), and one for "mode" (lines 3.2*). The five-way partitioning of "path", one for each of the five listed properties, is treated at lines 3.1.1.2.8.8.1* through 3.1.1.2.8.8.5*.

The field "mode" also has a partition, which is divided and the first subsidiary partition of which is a mask partition having three subsidiary expressions, one for each of three constants listed at the top of Appendix Q. These three subsidiary expressions are treated in Appendix R at lines 3.2.1.2.8.8.1.5.10.1* through 3.2.1.2.8.8.1.5.10.3*.

The Values section of Appendix Q includes a single, long block statement, which is treated in Appendix R at lines 4*. It includes four chained if-then-else statements to deal with the five possible properties, parsed in Appendix R at lines 4.5*.

While the parsing of Appendix Q is more extensive than that of the "Sample" specification of Appendix E, it breaks down to a basic level in the same manner, and is in principle the same procedure.

C. Transformation of the Parsed chmod Listing

The transformation procedure is in principle the same for "chmod" as it was for "Sample". The application of the generalized transformation procedure of Appendix C to the parsed chmod specification (Appendix R) is shown in detail in Appendix S. The resultant EFSM structure is represented graphically in FIGS. 6A–6B.

Creation of States S0 and S1

The transformation of chmod proceeds as follows. The method at step M1:1 creates an entry state S0 (vertex 200 in FIG. 6A), and at M1:2 creates a return value for the result of the chmod routine, in a declaration "int result". Then, a second state is created (step M1:2), namely state S1 (vertex 201) in FIG. 6A, and a transition (200.1 in FIG. 6A) is created to join the two states, as required in step M1:4.

The transition 200.1 also bears the annotation "chmod_2". This reflects the internal object numbering that occurs automatically in applicant's implementation of the system. In Appendix S (the description of the chmod transformation), references are made to these object numbers, which apply to the states as well as to the transitions; and numbers are assigned in the order that the objects are created according to the transformation method. Thus, state S0 is object 0 (or "chmod_0"); state S1 is created next, so it is chmod_1; transition 200.1 is created next, so it is chmod_2; etc. The "chmod_" reference numerals are useful in cross-referencing to the comments in Appendix S.

In steps M1:5 and M1:6, an annotation is added to the transition 200.1, namely a header string "{\n", and the "int result" string is added to this annotation, resulting in "T:{\nint result;". This appears as a test statement on transition 200.1. (In FIGS. 5A and 5B, the prefix "T" for any given edge indicates the presence of test data.) Once this transition is created, the state S1 stored as the current state.

Step M1:8 is directed to creating states and transitions relating to field groups. In chmod, there are two field groups: path and mode. These are first specified for chmod at line 796 of Appendix P. The path argument acts as a pointer to a path name for the file for which chmod is being invoked (i.e., the file for which the user wishes to change the access permissions). The asterisk (*) on line 796 is a conventional way of indicating that path is a pointer. The mode argument is assigned data type "mode_t", which is a standard POSIX data type (not used in the present example).

The first (and only) field in the path field group is that named "path", of a type which is not named, and which is classified as a signed integer occupying one byte of storage, and having upper and lower boundaries determined by the maximum positive and negative signed integers that may be stored in a single byte. (It is a signed integer because "char" in the C language is a signed integer, and line 796 of Appendix P indicates that the pointer path is a "const char".) This is all reflected at lines 3.1.1 through 3.1.1.2.5.8.4 of Appendix R.

Creation of State S2

Under "chmod2" in Appendix S, the first field is thus path, and in step M1:8.1 the subsidiary steps M1:8.1.1 through M1:8.1.5 are performed, namely the generation of a field declaration "char *(path)", the creation of a new state (S2) and a transition (201.2 in FIG. 6A) from state S1 to S2, the annotation of transition 201.2 with the declaration (test data) "char *(path)", and finally the storing of state S2 as the current state. This is all stated generally in steps M1:8.1.1 through M1:8.1.5 in module M1 of Appendix C, and is stated for the specific case of chmod in Appendix S, under "chmod2".

The type declarations are accomplished by a call to module M2 (DECL_TYPE) at step M1:8.1.1. Module M2 receives as input a string (here, the name of the field, "path" or "mode"), along with the type for the field. The module returns a formal parameter declaration.

The call from M1 to M2 is represented by the arrow 101.2 in FIG. 4. Module M2 may recursively call itself for complex data types such as indirections, as reflected by the leading comments in Appendix C, the descriptions at steps M1:2.1.2 and M1:2.2.2, and the recursive arrow 102.2 in FIG. 4.

Creation of State S3

Step M1:8 is repeated for the remaining field groups, which in this case leaves only the field group "mode". See the listing in Appendix R beginning with line 3.2. Under chmod3 in Appendix S, then, a procedure similar to chmod2 is carried out. The field declaration "int mode" is created (M1:8.1.1), a new state S3 (vertex 203 in FIG. 6A) is created, a transition (202.3) is created between states S2 and S3, the string "int mode" is added as test data to the transition, and the current state becomes S3. See FIG. 6A.

Creation of State S4

In chmod4 of Appendix S, steps M1:9.2 through M1:9.2.3 mark all processed fields. Then, step M1:9.2.4 calls module M3 (hence the arrow 101.3 in FIG. 4). Module M3 is entitled TRANSFORM_TYPE, and receives as input a string (typically identifying the name of a field), a partition which indicates the values of the type, a starting state and an ending state, between which states the type statement is to be placed. Module M3 then constructs a section of the EFSM wherein value assignments are made to the field identified by the input string. Module M6 (TRANSFORM_PARTITIONS) is called, as discussed below.

At steps M1:3.1 through M1:3.1.2.1, for each class of type, a partition is created if the class is "pointer", which is true for "path", and the partition level (0) is saved. Since the associated type is an integer (step M3.1.1.2), a new state S4 (vertex 204 in FIG. 6A) is created.

At step M3:1.1.2.2, the partition level is initialized to 0, and at step M3:1.1.2.3, module M6 is called to transform the partitions.

A partition is a conventional mechanism for dealing with different possible values of a variable. Module M6 converts the values identified in the partition into transitions with test annotations. For instance, since path has five alternative properties (see PROPERTY listing in Appendix Q), the partition must allow for all five possible values. A mask partition like this is a "divided" partition, which means that it includes a set of subsidiary partitions fully covering the set of values indicated.

At step M6:1, we proceed because the partition ("externally supplied counter") is zero. The starting state (S3) is stored. The partition is a divided partition (test at step M6:2), so the partition number is incremented, and now equals 1.

Creation of States S5, S6, S7, S8, S9

At step M6:2.2, a loop is begun to recursively call module M6 for each subsidiary partition of the divided partition. Since there are five subsidiary partitions, M6 will be called five times, as reflected in listings chmod5, chmod6, chmod7, chmod8 and chmod9 of Appendix S. (For the recursive calls, references in Appendix S will be to M6(2).) For all of these calls, the input string is "path".

When module M6 is called the partition level at first is 0. However, module M6 is called repeatedly and the counter is incremented each time (step M6:2.1) until the last (fifth) subsidiary partition is reached, i.e. partition level 4 corresponding to a TRUE result for chmod. (See line 3.1.1.2.8.8.5 in Appendix R and the last few lines of Appendix Q, indicating the success condition "file_exists_and_is_accessible".) Beginning with this fifth subsidiary partition, then, module M6 is called and the counter is decremented (step M6:2.3) until all five subsidiary partitions have been subjected to the procedure M6.

At the call of M6 under the chmod5 listing, the test at M6(2):1 is FALSE (because we are at the fifth subsidiary partition). The starting state is (still) S3, which is stored (step M6(2):1.1). This subsidiary partition is not itself a divided partition; see the test at step M6(2):2 (i.e. the recursive call of step M6:2). Nor is this partition a mask partition (step M6:3), a type partition (step M6:4), a discrete partition (step M6:5), a range partition (step M6:6), or an expression partition (step M6:7); so under the chmod5 listing of Appendix S, steps M6(6):2–7 are listed as not applicable. Rather, this subsidiary partition is a property partition (step M6(6):8); see line 3.1.1.2.8.8.5.1 of Appendix R as well as line 3.1.1.2.8.8.5.7.1, which names the property ("file_exists_and_is_accessible").

All of the five subsidiary partitions of path are, in fact, property partitions; see Appendix R at lines 3.1.1.2.8.8.1.1, 3.1.1.2.8.8.2.1, 3.1.1.2.8.8.3.1 and 3.1.1.2.8.8.4.1, and the corresponding properties named in lines 3.1.1.2.8.8.1.7.1, 3.1.1.2.8.8.2.7.1, 3.1.1.2.8.8.3.7.1 and 3.1.1.2.8.8.4.7.1, respectively (and listed at the beginning of Appendix Q).

At step M6(2):8.1 under chmod5 in Appendix S, a new state S5 (vertex 205 in FIG. 6A) is created, and a transition 203.5.1 is created from S3 to S5. It will be seen by inspecting the transformation procedure further that another transition 203.5.2 is also created, and that these transitions are annotated, respectively, with "P:!file_exists" and "P:file_exists".

Creation of States S10–S30

The remaining states and transitions are created in similar manner. Referring always to the Transformation Method Description in Appendix C and the parsed ISL listing for chmod in Appendix R, it will be seen that the description of the transformation of chmod set forth in Appendix S leads to the construction of an EFSM having the structure of EFSM 200 depicted FIGS. 6A–6B.

Attached as Appendix T is a test program for chmod, representing one path file, i.e, a particular path traversed through the chmod model of FIGS. 6A–6B. This test program was in part automatically generated by the actual implementation of applicant's method on a computer, and in part was manually constructed for illustrative purposes. (To automatically generate and run this test only, all of the parameter declarations would have to be present, and since they are interdependent upon other POSIX routines, this would be complicated.) The portion that was automatically produced from the chmod model is delimited with comments. The portion that is specific to the property being tested (in this case, file_exists_and_is_accessible) is also identified by a comment.

This program was produced by running the path generator on a model that contained a call to the chmod model. The starting model was hand-constructed using applicant's STE application. This hand-constructed model contained the "before" section (up to the property-specific part) as a fixed test data annotation (i.e. the same for all tests), and the "after" section (everything after the chmod call portion) is likewise fixed. The property-specific portion is implemented as a set of alternative transitions (one for each property). Each transition is tagged with an event named for the property, the name of the file is attached to the event as data, and test code that sets up the requisite file characteristics is added to the transition.

The chmod routine is not independent of the other POSIX routines; they have a very complicated set of interactions. Thus, any test built to model chmod must take into account this interaction by providing the other routines, or artificially provide the parameters required by chmod. In any case, Appendix T is a good representation of a test that would be fully and automatically produce by the method of the invention.

D. Traversal of the chmod EFSM and production of validation tests

The chmod EFSM represented in FIGS. 6A–6B is traversed in the manner described in Section II/Method Stage 4 above, and in essentially the same manner as the traversal of the "Sample" EFSM, as described above in Section V, stage 4.

The model of chmod, while conceptually similar to the "Sample" model, nonetheless presents considerably more possible paths, because of the numerous possible branches in series with one another, and thus results in a far greater number of path files. The model of FIGS. 6A–6B was actually constructed by applicant, and produced forty path files (with "allpaths", i.e. exhaustive testing), which leads to forty independent validation tests for any implementation of chmod.

Method stages 6–8 described in Section II are followed to create the program shells, couple the path files with the program shells, compile the resultant test source code and the source code for the implementation to be test, and finally to link the resultant test objects with the resultant implementation object to create test images. These test images are executed to generate the success and failure messages for the user.

As mentioned above, the validation tests for chmod may be linked with validation tests for all of the other routines defined for POSIX, resulting in a testing mechanism for the entire POSIX operating system. Thus, global success and failure variables may be defined for each routine, and flags may be defined for each routine, so that given paths are flagged by global variables. All of these flags may then be used as input for another defined routine in a serial fashion, so that, for instance, the open routine is tested only when certain paths in the chmod routine have been taken, and otherwise it is skipped.

The many path files for all the routines may also simply be concatenate for an exhaustive test of the entire system. Where this leads to too many tests, constraints may be placed by limiting numbers of iterations, selecting only certain paths through certain models, and so on.

VII. Method for Generating and Traversing a Multiple-EFSM Architecture

The method discussed in Section II above speaks primarily to the generation and traversal of a single-EFSM model of a specification. As mentioned, however, the invention is particularly suited for the creation and traversal of multi-layer architectures built up from many EFSMs, which allows quite complex specifications of state-rich constructs to be represented, or specifications such as POSIX that include many routines related in an intricate fashion.

To provide comprehensive testing of an architecture, this invention may be used, in conjunction with the system described in the aforementioned PFL patent application, including the STE graphical interface for building EFSM, or with some other such system for building EFSMs. An architecture of many related EFSMs or APIs is built up, where there may be complex dependencies between the inputs and outputs of different routines.

POSIX 1003.1 is an example of a specification from which an architecture may be built. For example, it contains a set of related APIs that operate on files (opening, closing, reading, writing, and otherwise manipulating them), and there are certain identifiable dependencies between these APIs. For example, it is typically necessary to open a file before reading from it, so there is a dependency between the open routine (which returns an open file descriptor) and the read routine (which requires an open file descriptor as input). There are numerous other codependencies, which will be expressed as inter-EFSM dependencies in the resultant architecture.

Figure 7:
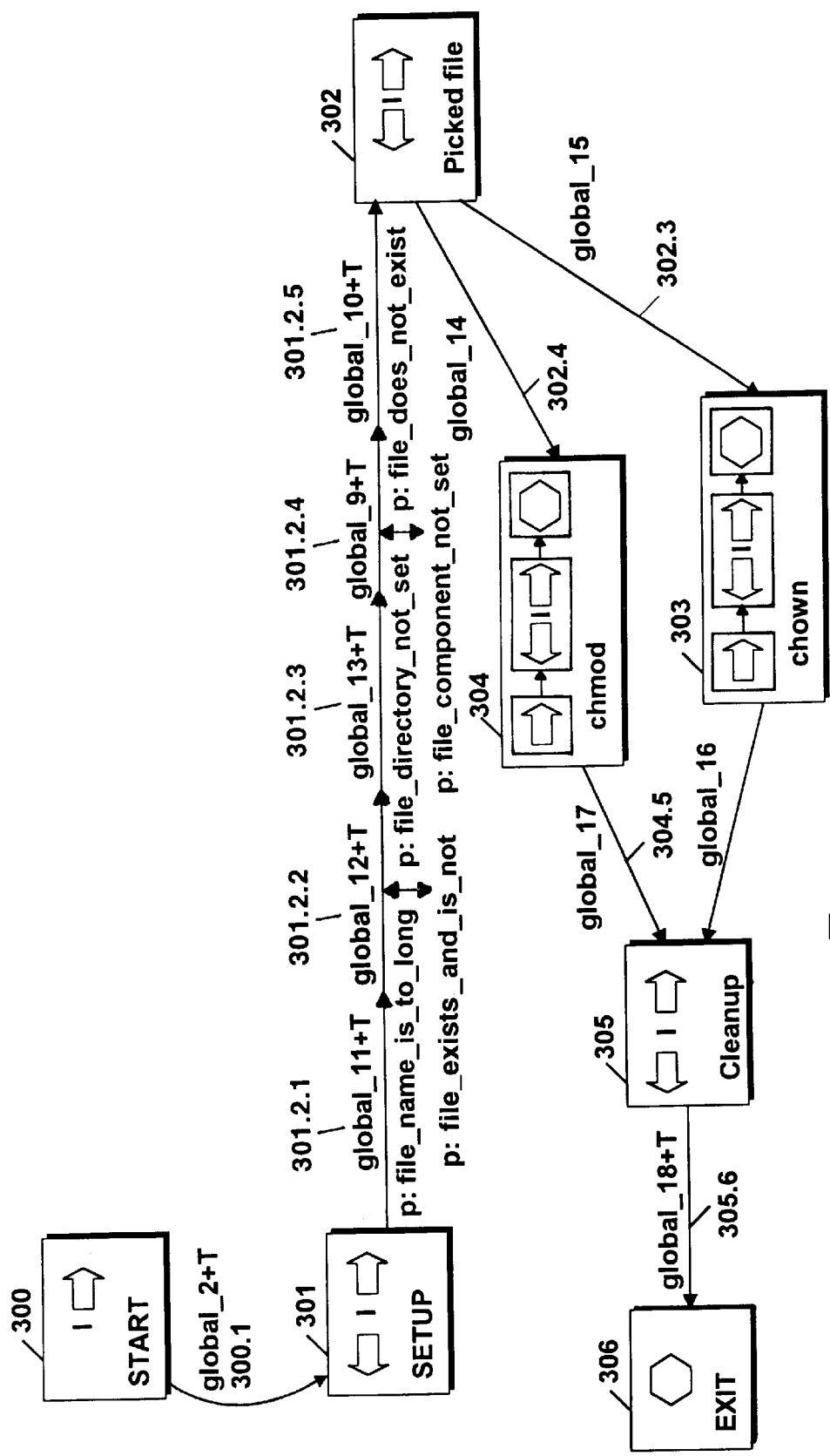
FIG. 7 is a state diagram of an EFSM showing a multiple-EFSM architecture (EFSMA), including the POSIX "chmod" and "chown" routines as two submodel EFSMs.

Using a system like STE/PFL, these dependencies may be described in an all-encompassing (hereinafter "global") EFSM, i.e. an architecture as defined above. This global EFSM includes references to other EFSMs, linked together by transitions that have been annotated with information controlling the sequence of API calls, as well as test data comprising, in conjunction with the code blocks produced from the subsidiary EFSMs, a complete program. FIG. 7 shows an example of such a global EFSM, and is described in detail below. FIG. 7 still does not represent the entire POSIX 1003.1 specification, but a subset of it, to illustrate the building of the architecture. An architecture of the entire specification would be quite a bit more complex.

Building on the foregoing method description of Section II, the method for generating a multiple-EFSM architecture may summarized as follows:

Architecture Stage 1: Create specifications for each routine in the architecture.
Architecture Stage 2: Parse the specifications.
Architecture Stage 3: Transform the parsed specifications.
Architecture Stage 4: Create architectural framework EFSM.
Architecture Stage 5: Traverse EFSM created in stage 4.
Architecture Stage 6: Post-process the path files.
Architecture Stage 7: Execute tests.

Figure 8:
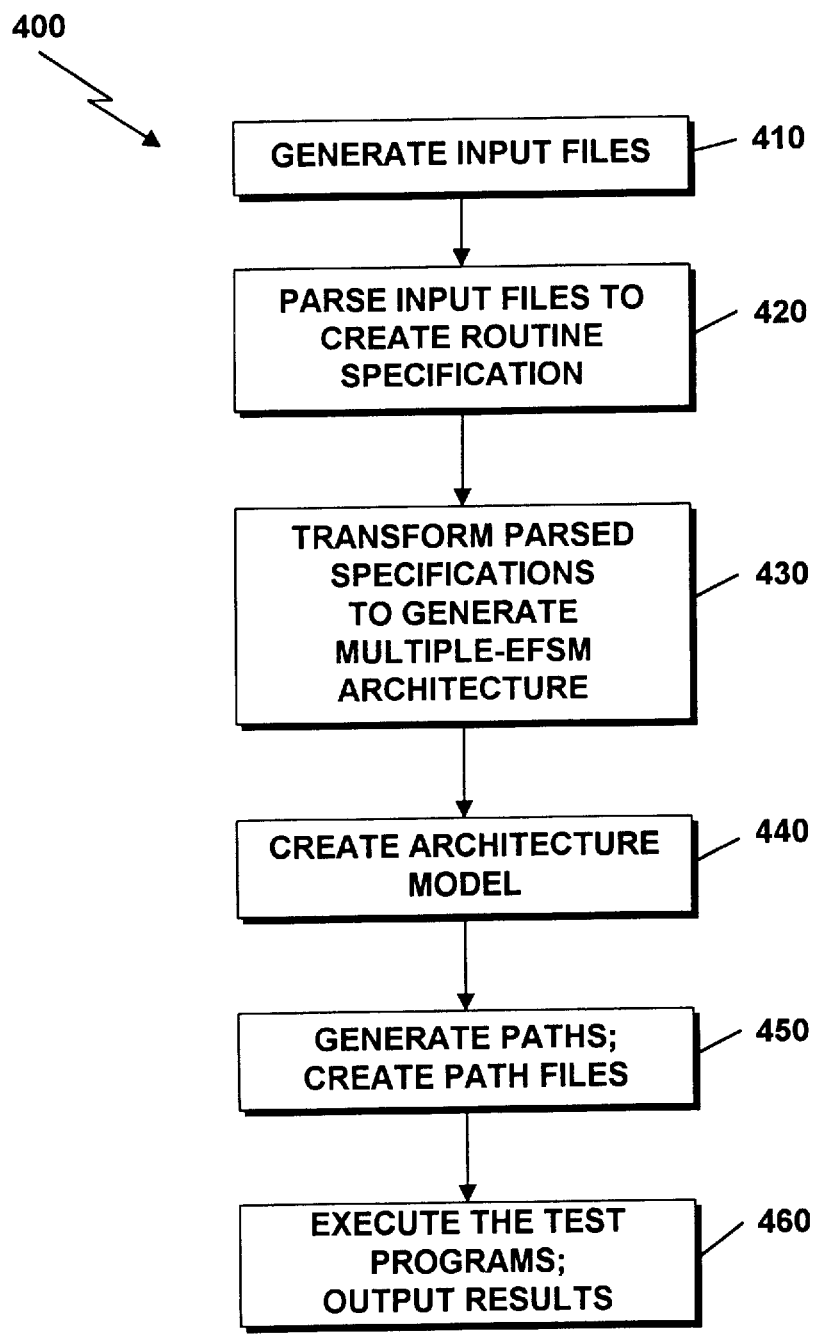
FIG. 8 is a flow chart of an alternative embodiment of the invention of FIG. 3 where multiple specifications are read in order to generate the extended finite state machine.

The method followed in carrying out these stages is similar to the method as described in Section II above, and is depicted in the flow chart 400 of FIG. 8. In that flow chart, the steps correspond to the architecture stages and to the analogous steps in flow chart 50 of FIG. 3 as follows:

| Figure 8 Step | Figure 3 Step | Architecture Stage |
| --- | --- | --- |
| 410 | 55 | 1 |
| 420 | 60 | 2 |
| 430 | 65 | 3 |
| 440 | 80 | 4 |
| 450 | 70 | 5,6 |
| 460 | 90 | 7 |

The differences include the following:

(1) Multiple specifications are created, parsed, and transformed (using the method of Section II).

(2) Instead of creating a simple program shell as in Section II, Stage 6, a global EFSM is created with EFSMs nested in a multilayer and recursive fashion as necessary, and including data annotations such that a path through the complete nesting of EFSMs results in a validation test program for the entire global EFSM.

(3) The path traversal is performed on the entire global EFSM; this includes, of course, traversal of all subsidiary EFSMs encountered during the traversal. Traversal of the subsidiary EFSMs is carried out in the manner described above in Section II, Method Stage 4.

(4) No additional program shell is necessary, as the resulting paths are complete programs ready for execution. Thus, once traversal of the global EFSM is complete, the validation tests are complete and may be executed immediately to test the overall specification modeled by the global EFSM.

FIG. 7 shows a global model that contains references to two subsidiary models, "chmod" and " chown". The test data annotations in this model are designed to duplicate the sample program shell for the chmod tests, which is given in the example chmod validation test of Appendix T.

The transition 300.1 between states 300 and 301 (named Start and Setup, respectively) includes as annotations all the necessary global declarations for the architecture of FIG. 7, including the requisite "#include <header file>" calls and function definitions. Transition 300.1 contains also the first portion of the main function, up to the line "errno=0;".

The five transitions 301.2.1, 301.2.2, 301.2.3, 301.2.4 and 301.2.5 between the states named Setup (state 301) and PickedFile (302) contain events, event data, and test data annotations that describe and set up files with specified characteristics. Transition 301.2.2, for example, is annotated with an event "file_exists_and_is_accessible", and the event annotation associated with this event is "file_777". The test data on this transition will be code that sets up a file named "file_777" that is accessible by anyone. This corresponds to the "property-specific" part of the test program for chmod shown in Appendix T, which sets out the code for setting up "file_777".

The other four transitions (301.2.1, 301.2.3, 301.2.4 and 301.2.5) are similarly constructed, with events, file names, and bodies of test code differing to satisfy different properties of files under test. The construction of all of the transitions in FIG. 7 is determined by the POSIX specification; but as mentioned above, in this example the architecture of FIG. 7 is a partial representation of POSIX.

In the flow of the global model after state 302 (PickedFile), there is a branch, where one of two models is called: "chmod" submodel (state 304) or the "chown" submodel (state 305). These submodels 304 and 305 are themselves EFSMs generated according to the previously described method. Thus, the "chown" model (for changing ownership of a file, not otherwise elaborated here) would be constructed using essentially the same method as that for constructing "chmod". After traversal through chmod or chown, as the case may be, then the flow proceeds to state 305 (Cleanup).

The transition between Cleanup and Exit (state 306) contains test code that reports on the success or failure of the test, and then exits, and closes the _main_function. This is comparable to the section at the end of Appendix T, following the comment "end chmod-transformed model portion".

The comprehensive and automatic testing of implementations against their source specifications is made possible by the automatic transformation of the specifications into finite state machines, many different uses for which will become apparent to those knowledgeable in the field.

What is claimed is:

1. A method, implemented in a computer system, for automatically generating an extended finite state machine (EFSM), the method including the steps of:

generating said extended finite state machine from a parsed form of a specification for a computer program wherein said generating step includes the substeps of:
(1) generating a start state for the EFSM;
(2) generating a declaration for a return value of the EFSM;
(3) generating a second state;
(4) logically coupling the start state to the second state by a first transition representing a function for a validation test;
(5) generating a program header string as an annotation to the first transition, the program header being in a form for execution in a predefined language;
(6) annotating the program header string to the first transition;
(7) generating a new state;
(8) generating a new transition representing another function for said validation test;
(9) connecting the new transition to the new state;
(10) annotating at least one function to said new state, said function being in a form for execution in said predefined language;
(11) generating an exit state from the parsed specification;
(12) repeating steps 7 through 11 to generate a plurality of transitions with annotated functions, with one function being generated for each function of said parsed specification;
(13) generating a transition from a most recent current state to the exit state;
(14) generating a final data string representing a call to an implementation of the specification defining an output value;
(15) annotating the final data string to the transition to the exit state, for invoking the implementation upon execution of a test including a path through the EFSM, wherein said states and transitions are generated from said parsed specification.

2. The method of claim 1, including:

generating at least one diagnostic string representing a test result for the implementation; and annotating the diagnostic to a diagnostic transition, for producing a diagnostic output upon execution of a test based upon a path filed through the EFSM that includes the diagnostic transition.

3. The method of claim 1, further including the steps of:

for each field in a plurality of fields defined in the specification, generating a type declaration and a field transition connecting a current state to a new state of the EFSM; and annotating a string representing the type declaration to the field transition.

4. The method of claim 1, further including the steps of:

for each event of a plurality of events defined in the specification, generating an event transition connecting a current state to a new state of the EFSM; and annotating a string representing the event to the event transition.

5. The method of claim 1, further including the steps of:

for each test statement of a plurality of test statements in the parsed specification, generating a test transition connecting a current state to a new state of the EFSM; and annotating the test statement to the test transition.

6. The method of claim 1, further including the steps of:

for each predicate of a plurality of predicates in the parsed specification, generating a predicate transition connecting a current state to a new state of the EFSM; and annotating the predicate to the predicate transition.

7. A computerized method of generating an extended finite state machine from a specification for a computer program, and of providing validation tests of the specification, the specification describing data and data relationships, the method comprising the steps of:

A) providing a parsed specification of the computer program to a computer, said parsed specification having components of expressions, components of declarations, and data context stored in a plurality of data structures;

B) transforming said parsed specification into an extended finite state machine, said transforming step having the substeps of 1) generating a start state for the extended finite state machine from a first data structure;

2) generating a second state for the extended finite state machine from said first data structure;

3) logically coupling said start state to said second state by a first transition, said transition being a first path through the extended finite state machine;

4) generating a second declaration for a second return value of the extended finite state machine from a second data structure;

5) generating a third state for the extended finite state machine from said second data structure;

6) logically coupling said third state to an already-generated state by a second transition, said second transition being a second path through the extended finite state machine;

7) repeating steps (4)–(6) until all said plurality of data structures in said parsed specification have been traversed;

8) generating an exit state for the extended finite state machine;

9) logically coupling said exit state to a most recent current state; and,

C) traversing said paths through the extended finite state machine to produce validation tests of the specification, whereby the computer program may be tested using said extended finite state machine.

* * * * *